United States Patent
Tian et al.

(10) Patent No.: US 12,554,417 B2
(45) Date of Patent: Feb. 17, 2026

(54) DISTRIBUTED DATA STORAGE CONTROL METHOD, READABLE MEDIUM, AND ELECTRONIC DEVICE

(71) Applicant: Beijing Volcano Engine Technology Co., Ltd., Beijing (CN)

(72) Inventors: Yangfeng Tian, Beijing (CN); Jie Wang, Beijing (CN); Peng Li, Beijing (CN); Jinfeng Yang, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/946,677

(22) Filed: Nov. 13, 2024

(65) Prior Publication Data
US 2025/0199695 A1    Jun. 19, 2025

(30) Foreign Application Priority Data
Dec. 14, 2023  (CN) .......................... 202311721391.1

(51) Int. Cl.
*G06F 3/06* (2006.01)

(52) U.S. Cl.
CPC .......... *G06F 3/0619* (2013.01); *G06F 3/0659* (2013.01); *G06F 3/067* (2013.01)

(58) Field of Classification Search
CPC ...... G06F 3/0619; G06F 3/0659; G06F 3/067; G06F 16/2365; G06F 16/24552; G06F 16/273
See application file for complete search history.

(56) References Cited

U.S. PATENT DOCUMENTS

| | | | |
|---|---|---|---|
| 8,930,333 B1* | 1/2015 | Prince | G06F 16/1774 707/704 |
| 9,213,717 B1* | 12/2015 | Pawar | G06F 16/1774 |
| 11,546,337 B2* | 1/2023 | Le | H04L 67/1097 |
| 2003/0131204 A1 | 7/2003 | Lin et al. | |
| 2003/0191745 A1* | 10/2003 | Jiang | G06F 16/10 |

(Continued)

FOREIGN PATENT DOCUMENTS

| CN | 1461438 A | 12/2003 |
|---|---|---|
| CN | 103559319 A | 2/2014 |

(Continued)

OTHER PUBLICATIONS

Office Action for Chinese Patent Application No. 202311721391.1, mailed on Nov. 10, 2025, 19 pages.

(Continued)

*Primary Examiner* — Jason W Blust
(74) *Attorney, Agent, or Firm* — Astute IP Law Group

(57) ABSTRACT

The present disclosure relates to a distributed data storage control method and apparatus, a readable medium, and an electronic device. The method includes: after receiving a write lock and modifying a file size according to the write lock, caching, by a worker node, the modified file size in the worker node until a write lock request sent by a distributed lock management and control node for taking back the write lock is responded to, and then transmitting the modified file size to the distributed lock management and control node, so that the distributed lock management and control node updates the file size.

18 Claims, 11 Drawing Sheets

(56) References Cited

U.S. PATENT DOCUMENTS

| | | | | |
|---|---|---|---|---|
| 2004/0133570 A1* | 7/2004 | Soltis | .................... | G06F 16/182 |
| 2012/0066191 A1* | 3/2012 | Chang | ................ | G06F 16/1774 |
| | | | | 707/827 |
| 2016/0004718 A1* | 1/2016 | Lin | .................... | G06F 11/1004 |
| | | | | 707/690 |
| 2017/0160980 A1* | 6/2017 | Golander | ............ | G06F 16/2308 |
| 2021/0157830 A1 | 5/2021 | Chen et al. | | |

FOREIGN PATENT DOCUMENTS

| | | |
|---|---|---|
| CN | 104113587 A | 10/2014 |
| CN | 104113587 B | 8/2017 |
| CN | 112069266 A | 12/2020 |

OTHER PUBLICATIONS

Qian et al., "Application and optimization for Lustre file I/O locking", Computer Engineering and Applications, vol. 47, No. 3, Jan. 21, 2011, 6 pages, with English Abstract.

* cited by examiner

DISTRIBUTED DATA STORAGE CONTROL METHOD, READABLE MEDIUM, AND ELECTRONIC DEVICE

CROSS-REFERENCE TO RELATED APPLICATION

This application claims the priority to and benefits of the Chinese Patent Application, No. 202311721391.1, which was filed on Dec. 14, 2023. The aforementioned patent application is hereby incorporated by reference in its entirety.

TECHNICAL FIELD

The present disclosure relates to the field of computer technologies, and in particular, to a distributed data storage control method and apparatus, a readable medium, and an electronic device.

BACKGROUND

With the rapid development of computer technologies, distributed systems have been widely used. In the related art, after modifying an obtained shared resource, a worker node in a distributed system needs to transmit the modified shared resource to a management node of the shared resource in real time, to ensure consistency of the shared resource.

SUMMARY

The Summary is to introduce the concepts in a simplified form, which will be described in detail below in the Detailed Description. The Summary is neither intended to identify key features or necessary features of the claimed technical solutions, nor is it intended to be used to limit the scope of the claimed technical solutions.

According to a first aspect, the present disclosure provides a distributed data storage control method. The method includes:

sending, in response to a first modification request, which is sent by a client, for a target file, a first obtaining request to a distributed lock management and control node, the first obtaining request being used to obtain a first write lock, a first inode identifier, and a first file size, the first write lock being used to control a write operation performed by a node on the target file, the first inode identifier being used to identify an inode of the target file, and the first file size being a file size of the target file;

receiving the first write lock, the first file size, and the first inode identifier that are sent by the distributed lock management and control node in response to the first obtaining request, modifying the first file size based on first modification information in the first modification request to obtain a second file size, and caching, based on the first inode identifier, the second file size at a target location in a first index data table, the first index data table being stored in a current node; and sending, in response to a take-back request sent by the distributed lock management and control node and used to take back the first write lock, the first write lock, the first inode identifier, and the second file size to the distributed lock management and control node, so that the distributed lock management and control node updates the first file size, corresponding in a second index data table to the first inode identifier to the second file size, the second index data table being stored in the distributed lock management and control node.

According to a second aspect, the present disclosure provides a distributed data storage control method. The method includes:

sending, in response to a first obtaining request, which is sent by a worker node, for obtaining a first write lock, a first inode identifier, and a first file size, the first write lock, the first file size, and the first inode identifier to the node, the first write lock being used to control a write operation performed by the node on a target file, the first inode identifier being used to identify an inode of the target file, and the first file size being a file size of the target file;

sending, in response to the first obtaining request sent by another node, a take-back request used to take back the first write lock to the worker node; and receiving the first write lock, the first inode identifier, and a second file size that are sent by the node in response to the take-back request, obtaining the first file size in a second index data table based on the first inode identifier, and updating the first file size in the second index data table to the second file size, the second index data table being stored in a current node, the second file size being obtained by the node by modifying the first file size that is sent by the distributed lock management and control node based on first modification information in a first modification request, and the first modification request being sent by a client.

According to a third aspect, the present disclosure provides a distributed data storage control apparatus. The apparatus includes:

a first sending module, configured to send, in response to a first modification request, which is sent by a client, for a target file a first obtaining request to a distributed lock management and control node, the first obtaining request being used to obtain a first write lock, a first inode identifier, and a first file size, the first write lock being used to control a write operation performed on the target file, the first inode identifier being used to identify an inode of the target file, and the first file size being a file size of the target file;

a first receiving module, configured to receive the first write lock, the first file size, and the first inode identifier that are sent by the distributed lock management and control node in response to the first obtaining request, modify the first file size based on first modification information in the first modification request to obtain a second file size, and cache, based on the first inode identifier, the second file size at a target location in a first index data table, the first index data table being stored in a current node; and a second sending module, configured to send, in response to a take-back request sent by the distributed lock management and control node and used to take back the first write lock, the first write lock, the first inode identifier, and the second file size to the distributed lock management and control node, so that the distributed lock management and control node updates the first file size corresponding to the first inode identifier, in a second index data table to the second file size, the second index data table being stored in the distributed lock management and control node.

According to a fourth aspect, the present disclosure provides a distributed data storage control apparatus. The apparatus includes:

an eighth sending module, configured to send, in response to a first obtaining request for a first write lock, a first inode identifier, and a first file size that is sent by a node, the first write lock, the first file size, and the first inode identifier to the node, the first write lock being used to control a write operation performed by the node on a target file, the first inode identifier being used to identify an inode of the target file, and the first file size being a file size of the target file;

a ninth sending module, configured to send, in response to the first obtaining request sent by another node, a take-back request sent by the distributed lock management and control node and used to take back the first write lock; and an updating module, configured to receive the first write lock, the first inode identifier, and a second file size that are sent by the node in response to the take-back request, obtain the first file size in a second index data table based on the first inode identifier, and update the first file size in the second index data table to the second file size, the second index data table being stored in a current node, the second file size being obtained by the node by modifying the first file size that is sent by the distributed lock management and control node based on first modification information in a first modification request, and the first modification request being sent by a client.

According to a fifth aspect, the present disclosure provides a computer-readable medium having a computer program stored thereon. When the program is executed by a processing apparatus, the steps of the method according to any one of the first aspect or the second aspect are implemented.

According to a sixth aspect, the present disclosure provides an electronic device. The electronic device includes:

a storage apparatus having a computer program stored thereon; and a processing apparatus configured to execute the computer program in the storage apparatus, to implement the steps of the method according to any one of the first aspect or the second aspect.

The other features and advantages of the present disclosure will be described in detail in the following specific implementations.

BRIEF DESCRIPTION OF DRAWINGS

The above and other features, advantages, and aspects of embodiments of the present disclosure become more apparent with reference to the following specific implementations and in conjunction with the accompanying drawings. Throughout the drawings, the same or similar reference numerals denote the same or similar elements. It should be understood that the accompanying drawings are schematic and that parts and elements are not necessarily drawn to scale. In the drawings.

DETAILED DESCRIPTION

Figure 1:
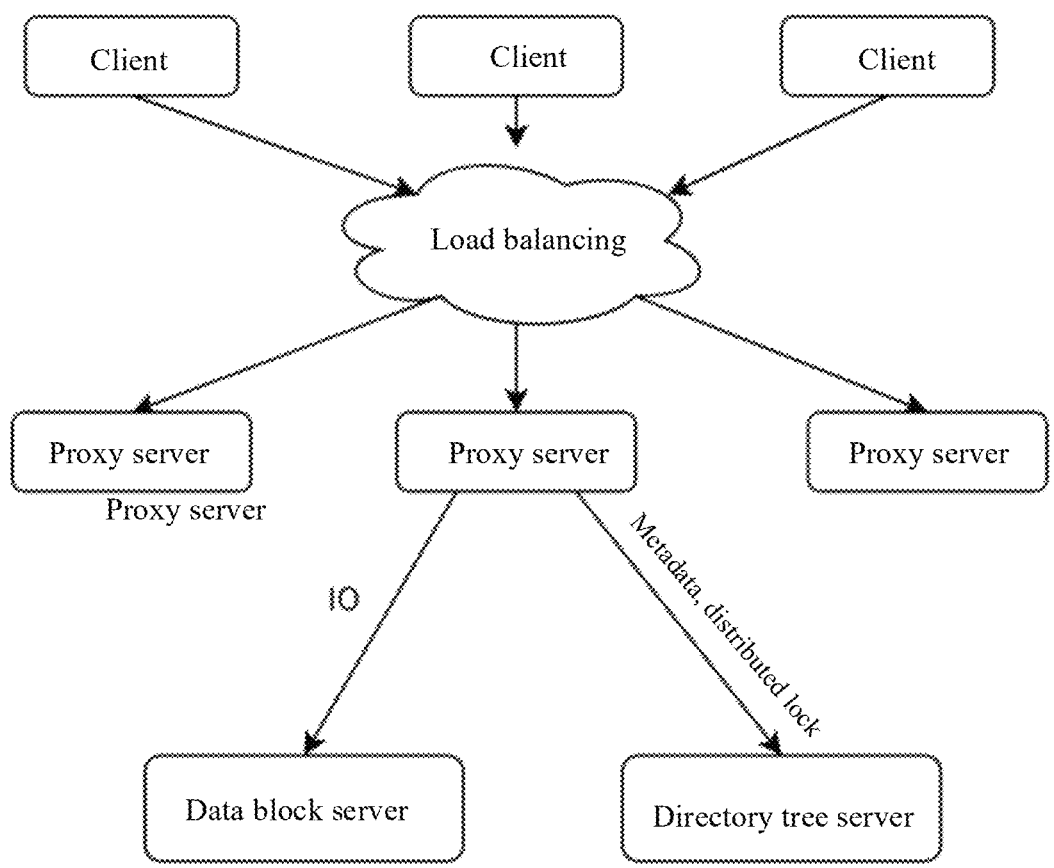
FIG. 1 is a schematic diagram of a storage architecture of a network storage according to an exemplary embodiment of the present disclosure.

Embodiments of the present disclosure will be described in more detail below with reference to the accompanying drawings. Although some embodiments of the present disclosure are shown in the drawings, it would be appreciated that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are only for exemplary purposes, and are not intended to limit the scope of protection of the present disclosure.

As mentioned in the Background, with the rapid development of computer technologies, distributed systems have been widely used. To prevent mutual interference between a plurality of worker nodes in a distributed system, the worker nodes are scheduled by using a distributed lock (a write lock or a read lock). In other words, when a specific worker node is granted the distributed lock, another worker node cannot invoke the distributed lock.

In the related art, after modifying an obtained shared resource, a worker node needs to transmit the modified shared resource to a management node of the shared resource in real time, to ensure consistency of the shared resource.

For example, as shown in FIG. 1, in a storage architecture of a network storage, a proxy server (proxy), block servers (Blockservers, BSs), and a directory tree server are included.

The proxy is responsible for parsing a protocol request sent by a client, where the protocol request includes a network file system, a server message block, a user space file system, and the like, and sending the parsed request to a back-end storage cluster. In this process, the proxy needs to interact with the directory tree server and the BSs.

The directory tree server is used to manage a file directory tree, and is responsible for metadata services and distributed lock services and for managing all metadata attributes of a file.

The BSs are responsible for read and write operations and data flushing of files. In other words, the proxy needs to interact with the BSs for the read and write operations of files. In addition, the BSs manage segment units, and one file is divided into 16 segments by 64 KB. When the proxy issues an I/O request, a corresponding segment needs to be calculated based on modification information, that is, an offset and a length in the modification request, and then an I/O request is initiated to a corresponding BS.

In the related art, the storage architecture designs a distributed lock for metadata, and optimizes a file size (size), that is, the size is transferred from original BS storage to directory tree server storage, so that when a subsequent proxy needs to obtain the size, the size is directly obtained from the directory tree server instead of directly from the BSs. In addition, a size distributed read-write lock is designed for the size, and read-read is compatible, and read-write and write-write are mutually exclusive. The proxy can directly trust a cached size when there is the size distributed lock, and does not need to obtain the size from the back-end cluster again; or the proxy needs to apply for the size distributed lock from the directory tree server when there is no size distributed lock, and after the application is successful, the distributed lock is recorded and the size is cached.

When applying for the size distributed lock from the directory tree server, the proxy needs to distinguish whether a size write lock or a size read lock is required based on a usage scenario. For example, a get attribute (GetAttr) request requires only the size read lock, and an append write request requires the size write lock. After receiving the size distributed lock request, the directory tree server first revokes a conflicting distributed lock based on a read-write lock conflict, and then allocates a lock. In particular, considering a read-write concurrency optimization, the size read lock is optimized as a non-essential lock. When the directory tree server receives an application for the size read lock, if it is found that the size write lock is allocated to an external device and there is a size update recently, the size write lock is not revoked, the size read lock is not allocated, and only a temporary size is returned for the proxy to use.

In a scenario of modifying the size by the proxy, that is, an append write scenario and a truncation operation scenario, the proxy needs to first apply for the size write lock, and protect the size write lock from being revoked by using a memory lock. Then, the proxy writes the BS in a size write lock valid scenario, and after the size is synchronously flushed to the directory tree server after the BS is written, the proxy can return success to the user.

However, in size processing logic of the current architecture, after modifying the size, the proxy immediately synchronizes the modified size to the directory tree server, resulting in a large quantity of requests for synchronizing the size to the directory tree server in a scenario of concurrently modifying the size at a high frequency, thereby causing an excessively high central processing unit (CPU) utilization of the directory tree server and affecting performance and concurrency of the distributed lock management and control node.

In view of this, the present disclosure provides a distributed data storage control method and apparatus, a readable medium, and an electronic device, to solve the above technical problems.

The following further describes embodiments of the present disclosure with reference to the accompanying drawings.

Figure 2:
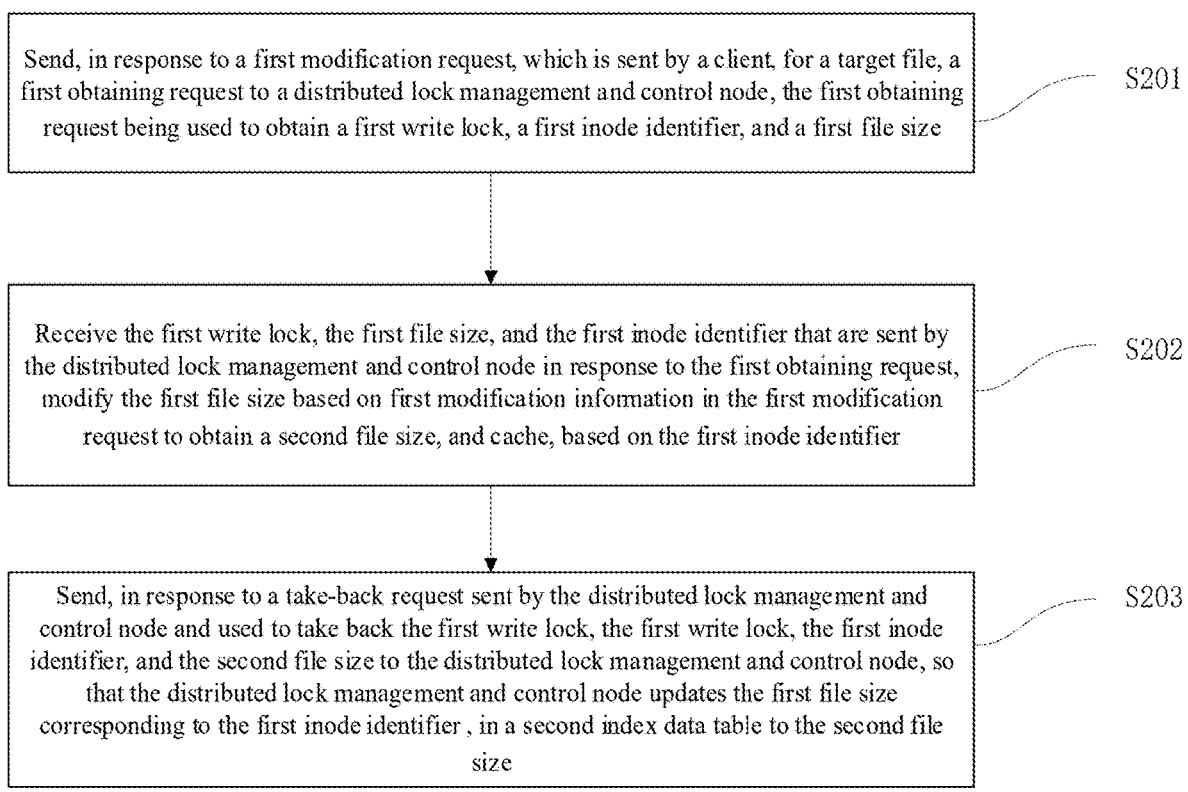
FIG. 2 is a flowchart of a distributed data storage control method according to an exemplary embodiment of the present disclosure.

FIG. 2 is a flowchart of a distributed data storage control method according to an exemplary embodiment of the present disclosure. Referring to FIG. 2, the method may include the following steps:

S201: Send, in response to a first modification request, which is sent by a client, for a target file, a first obtaining request to a distributed lock management and control node, the first obtaining request being used to obtain a first write lock, a first inode identifier, and a first file size, the first write lock being used to control a write operation performed by a worker node on the target file, the first inode identifier being used to identify an inode of the target file, and the first file size being a file size of the target file.

It should be understood that the distributed lock management and control node is a node used to manage or schedule a distributed lock, and the worker node is a node that needs to obtain the distributed lock to obtain a target resource. Depending on an application scenario, the distributed lock management and control node and the worker node may be specifically determined based on an actual situation. For example, in a storage architecture of a network storage, the distributed lock management and control node may be a directory tree server, and the worker node may be a proxy. The target resource is content that the client hopes to read from or write into, such as a specific file, video, audio, and the like. A specific form of the target resource is subject to an actual application, and is not limited in the embodiments of the present disclosure.

In addition, it should be understood that the inode is a data structure used to store metadata of a file, and each file has a unique inode in a file system. Through the inode, the file system can quickly access attributes and content of the file, without searching based on a file name. The metadata is data that describes a file or directory, and includes attribute information of the file, such as a file name, a file size, a creation time, and a modification time. In addition, to quickly find an inode corresponding to each file, an inode identifier is generally allocated to each inode, and the inode identifier is bound to a corresponding file and a corresponding inode. Therefore, when a file attribute of the target file needs to be obtained, a target inode identifier may be first obtained based on a binding relationship between the target file and the file and the inode identifier, then a target inode is obtained based on the target inode identifier and a binding relationship between the inode identifier and the inode, and finally the file attribute of the target file is obtained by accessing the target inode.

The inode identifier may be specifically set based on an actual situation, and is not limited in the embodiments of the present disclosure. For example, 1111 may be used to represent an inode 1, 2222 may be used to represent an inode 2, or AAA may be used to represent the inode 1, and BBB may be used to represent the inode 2.

S202: Receive the first write lock, the first file size, and the first inode identifier that are sent by the distributed lock management and control node in response to the first obtaining request, modify the first file size based on first modification information in the first modification request to obtain a second file size, and cache, based on the first inode identifier, the second file size at a target location in a first index data table, the first index data table being stored in a current worker node.

The first modification information may include an offset, a length, and the like, and a start position of data to be modified in the target file may be determined based on the offset, and a length of the data to be modified may be determined based on the length, so that the second file size may be obtained based on the received first file size, the offset, and the length.

The first index data table is a data table in a current worker node and used to store index data of a file. The index data may include the inode identifier, an inode, and the like. A structure of the first index data table may be set based on an actual situation, and is not limited in the embodiments of the present disclosure. For example, a data structure of the first index data table may be shown in Table 1.

TABLE 1

| First index data table | |
| --- | --- |
| Inode identifier | Inode |
| Inode identifier 1 | Inode 1 = {file name: xxx; file size: xx; node validity flag: xx ; . . . } |
| Inode identifier 2 | Inode 2 = {file name: ***; file size: **; node validity flag: xx ; . . . } |
| . . . | . . . |

S203: Send, in response to a take-back request sent by the distributed lock management and control node and used to take back the first write lock, the first write lock, the first inode identifier, and the second file size to the distributed lock management and control node, so that the distributed lock management and control node updates the first file size corresponding to the first inode identifier, in a second index data table to the second file size, the second index data table being stored in the distributed lock management and control node.

The second index data table is a data table in the distributed lock management and control node and used to store index data of a file. The index data may include the inode identifier, an inode, and the like. A structure of the second index data table may be the same as or different from that of the first index data table, and is not limited in the embodiments of the present disclosure.

By using the above technical solutions, after receiving a write lock, an inode identifier, and a file size from a distributed lock management and control node, a worker node may modify the file size based on modification information in a modification request, cache, in a first index data table, a file size obtained through modification at a target location corresponding to the inode identifier, and send the inode identifier and a file size corresponding to the inode identifier in the first index data table to the distributed lock management and control node in response to a take-back request for the write lock, so that the distributed lock management and control node updates, in a second index data table, a file size corresponding to the inode identifier to the received file size. In this way, after modifying the file size, the worker node does not immediately send the modified file size to the distributed lock management and control node, but caches the modified file size in the first index data table, and transmits the modified file size to the distributed lock management and control node in response to the take-back request. Therefore, it is avoided that in a scenario of concurrently modifying the file size at a high frequency, a quantity of requests for synchronizing the file size to the distributed lock management and control node is too large, affecting performance and concurrency of the distributed lock management and control node.

In a possible implementation, the method may further include:

modifying the second file size based on second modification information in a second modification request for the target file that is sent by the client to obtain a modified second file size, and updating the second file size in the first index data table to the modified second file size.

It should be understood that during a write lock holding period, the worker node may change the file size a plurality of times.

By using the above technical solutions, the worker node does not need to transmit the file size obtained through each modification to the distributed lock management and control node. Therefore, a quantity of communications between the distributed lock management and control node and the worker node and a quantity of updates of the file size in the second index data table by the distributed lock management and control node may be reduced, thereby improving the performance and concurrency of the distributed lock management and control node. In addition, because the worker node caches the file size obtained through modification after modifying the file size of the target file, the next time the file size of the target file is read or changed, the file size does not need to be obtained from the distributed lock management and control node again, thereby improving the efficiency of obtaining the file size.

As described above, during a write lock holding period, the file size obtained through modification by the worker node is not immediately transmitted to the distributed lock management and control node, but is transmitted to the distributed lock management and control node when the write lock is taken back. When the write lock holding time is long, the distributed lock management and control node cannot obtain the latest file size for a long time. Therefore, when calculating a quota, the distributed lock management and control node still calculates the quota based on the file size before the update, resulting in an error in the calculated quota. To overcome the above technical problem, in this embodiment, the file size is periodically transmitted back to the distributed management and control system, so that the distributed management and control system can update the file size in the second index data table in a timely manner.

In other words, in a possible implementation, the method may further include:

periodically obtaining write lock validity information representing whether the first write lock is valid; and when the write lock validity information represents that the first write lock is valid, sending the first inode identifier, the second file size, and a first write lock identifier to the distributed lock management and control node, so that the distributed lock management and control node obtains the first file size and a second write lock identifier from the second index data table based on the first inode identifier, and updates the first file size to the second file size based on the first write lock identifier and the second write lock identifier, where the first write lock identifier is used to identify the first write lock, the first write lock identifier is sent when the distributed lock management and control node sends the first write lock to the worker node, and the second write lock identifier is used to identify a second write lock currently controlling the write operation performed by the worker node on the target file.

The period for obtaining the write lock validity information may be 10 s, 30 s, or 1 min. This is not limited in the embodiments of the present disclosure.

The write lock validity information may be obtained from the first index data table. For example, when the worker node receives the first write lock, the first file size, and the first inode identifier that are sent by the distributed lock management and control node, the worker node first obtains a corresponding inode from the first index data table based on the first inode identifier, and then records the write lock validity information in the inode. For example, information "receiving the first write lock at moment t" is filled in a write lock validity information filling position, or "true" is filled in the write lock validity information filling position. Similarly, when the worker node receives the take-back request sent by the distributed lock management and control node, the worker node may also first obtain a corresponding inode from the first index data table based on the first inode identifier, and then records the write lock validity information in the inode. For example, information "the first write lock is taken back at moment t+10" is filled in the write lock validity information filling position, or "false" is filled in the write lock validity information filling position.

When the write lock validity information represents that the first write lock is invalid, it indicates that the first write lock has been taken back, and therefore does not need to be updated.

The write lock identifier may be set based on an actual situation, and is not limited in the embodiments of the present disclosure. For example, a write lock 1 may be represented by a letter A, a write lock 2 may be represented by a letter B, and a write lock 3 may be represented by a letter C. Alternatively, the write lock 1 may be represented by a number 1, the write lock 2 may be represented by a number 2, and the write lock 3 may be represented by a number 3.

It should be understood that the write lock and the write lock identifier are generally in a one-to-one correspondence, and the write lock identifier is sent to the distributed lock management and control node when the file size is updated, so that an update error can be avoided.

For example, it is assumed that a second file size sent by a worker node 1 in a specific sending period is 10, and before the distributed lock management and control node receives the second file size sent by the worker node 1, the worker node 1 updates the second file size to 20, and the distributed lock management and control node takes back a write lock 1 of the worker node 1. Because the second file size in the worker node 1 is 20 when the write lock 1 is taken back, the distributed lock management and control node updates the first file size in the second index data table to 20. At the same time, the distributed lock management and control node also allocates a write lock 2 used to control the write operation performed by the worker node on the target file to a worker node 2. If the distributed lock management and control node receives the second file size sent by the worker node 1 at this time, if the write lock identifier is not sent, the distributed lock management and control node changes the first file size in the second index data table from 20 to 10, resulting in an update error.

In a possible implementation, to avoid updating, to the distributed lock management and control node, a file size that does not change in two update intervals, an update identifier may be further added to an inode in which the file size is updated. For example, a dirty tag may be added to a target inode in which the file size changes but has not been updated back to the distributed lock management and control node. In this way, during updating, it may be determined based on the dirty tag whether the file size needs to be updated back to the distributed lock management and control node, to avoid invalid updating and resource waste. Correspondingly, the distributed lock management and control node needs to clear a corresponding dirty tag when updating the file size in the second index data table.

It should be understood that one file can be modified by only one worker node at a specific moment, but one worker node may modify a plurality of files at a specific moment. Therefore, a plurality of inode identifiers, a plurality of write lock identifiers, and file sizes of a plurality of files may exist in one worker node. Therefore, in a possible implementation, when there are a plurality of file sizes, a plurality of inode identifiers, and a plurality of write lock identifiers in the worker node, all the file sizes in the worker node may be updated to the second index data table in each update cycle.

For example, an update request including a plurality of target inode identifiers, a plurality of file sizes, and a plurality of write lock identifiers may be periodically generated and sent to the distributed lock management and control node, so that the distributed lock management and control node updates the file sizes in the second index data table based on the target inode identifiers, the file sizes, and the write lock identifiers included in the update request.

A quantity of inode identifiers, file sizes, or write lock identifiers in the update request may be set based on an actual situation, and is not limited in the embodiments of the present disclosure. Because when updating the file size corresponding to the inode identifier, to avoid a worker node changing the file size corresponding to the inode identifier during an update process, the distributed lock management and control node adds a memory lock to an inode whose file size needs to be updated in the second index data table during the update process. Therefore, to avoid the distributed lock management and control node occupying the inode whose file size needs to be updated in the second index data table for a long time and affecting the read and write operations of the worker node on the inode, the quantity of inode identifiers, file sizes, or write lock identifiers in the update request cannot be set to be too large.

By using the above technical solutions, a plurality of inode identifiers, a plurality of file sizes, and a plurality of write lock identifiers may be packed into one update request, thereby reducing a quantity of communications between the worker node and the distributed lock management and control node, reducing communication overheads, and further improving the performance of the worker node and the distributed lock management and control node.

In a possible implementation, to avoid that after modifying the file size, the worker node loses the write lock and the modified file size due to an exception of the worker node, for example, a failure or a restart, so that the file size corresponding to the inode identifier in the second index data table cannot be updated, thereby causing the file size corresponding to the inode identifier in the second index data table to fail to truly reflect the file size of the file corresponding to the inode identifier. In this embodiment, a three-level storage architecture is proposed. That is, in addition to storing index data of each file in the worker node and the distributed lock management and control node, the index data of each file is further stored in a resource management node, so that when the file size in the worker node is lost, the file size corresponding to the inode identifier may be obtained from the resource management node based on the inode identifier.

The file size in the resource management node may be determined and saved before the worker node updates the file size in the first index data table. For example, before updating the file size in the first index data table based on the modification information, the worker node first changes, in the resource management node based on the modification information and the inode identifier, a file corresponding to the inode identifier to obtain a changed file size, so that after the worker node fails, the corresponding file size may be obtained from the resource management node based on the inode identifier.

The resource management node is a node used to store and manage a file, and may be specifically determined based on an actual situation. For example, in the storage architecture of the network storage, the resource management node may be a BS.

In addition, because the distributed lock management and control node and the worker node cannot sense whether the file size in the second index data table is abnormal, in this embodiment, a node validity flag trust_dn_size is further set for each inode identifier in the second index data table, and is used to mark whether the file size corresponding to the inode identifier is valid. For example, when the trust_dn_size is false, it may represent that the file size corresponding to the inode identifier is invalid or the file size is incorrect; or when the trust_dn_size is true, it may represent that the file size corresponding to the inode identifier is valid or the file size is correct. Therefore, the worker node may determine, based on the trust_dn_size, whether the file size sent by the distributed lock management and control node is correct, and if not, obtain the file size from the resource management node.

In other words, according to an embodiment of the present disclosure, the method may further include:

receiving a node validity flag sent by the distributed lock management and control node and representing whether the first file size is valid while receiving the first write lock, the first file size, and the first inode identifier; when the node validity flag represents that the first file size is valid, caching the first file size at the target location in the first index data table based on the first inode identifier; when the node validity flag represents that the file size is invalid, sending a read request for reading a file size of the target file to a resource management node, so that the resource management node obtains, from a third index data table based on the first inode identifier in the read request, a third file size of the target file, the third index data table being stored in the resource management node; and receiving the third file size, and caching the third file size at the target location in the first index data table based on the first inode identifier.

The third index data table is a data table in the resource management node and used to store index data of a file. The index data may include the inode identifier, an inode, and the like. A structure of the third index data table may be the same as or different from that of the first index data table or the second index data table, and is not limited in the embodiments of the present disclosure.

It should be noted that a default value of the trust_dn_size is true, and when the distributed lock management and control node fails to take back the write lock, the value of the rust_dn_size is changed from true to false. The failure to take back the write lock may include that the write lock of the worker node is lost or no response is received within a preset time.

In addition, to ensure that after the distributed lock management and control node is restarted, it can still know which write locks are lost previously, the distributed lock management and control node needs to persistently store the trust_dn_size.

In addition, it should be noted that when the write lock is lost and the file size is obtained from the resource management node by using the foregoing solution, the distributed lock management and control node still cannot change the trust_dn_size to true within a period of time (for example, 60 seconds). In other words, within 60 seconds, the worker node needs to obtain the file size from the third index data table, to avoid inconsistency between the file size in the third index data table and the file size in the second index data table.

Figure 3:
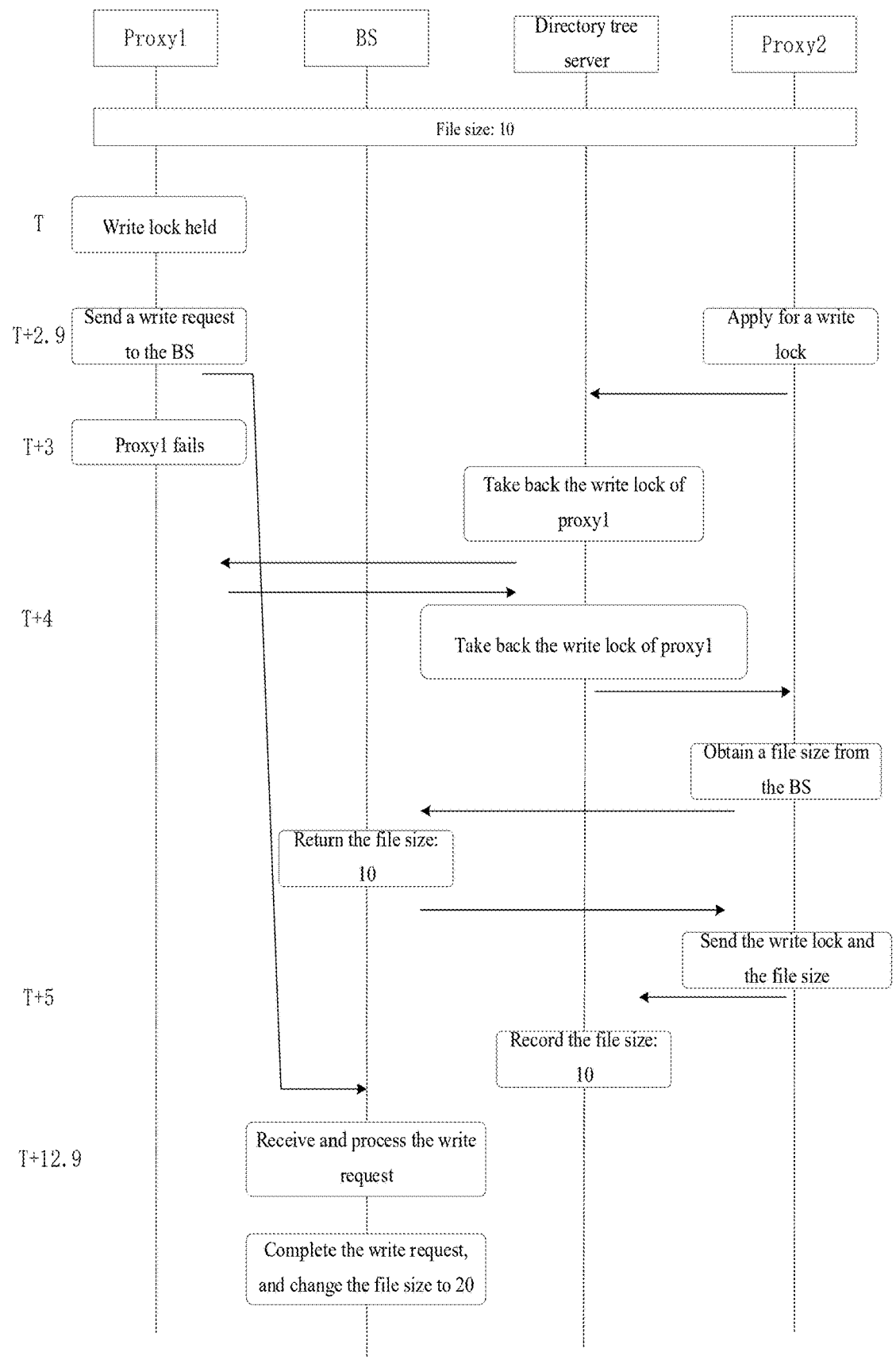
FIG. 3 is a schematic diagram of inconsistency between file sizes in a distributed lock management and control node and a resource management node caused by file size updating according to an exemplary embodiment of the present disclosure.

For example, as shown in FIG. 3, it is assumed that an original file size of a file A is 10, a worker node 1 holds a write lock of the file A, and sends a write request (to modify the file A) to a resource management node at 2.9 seconds, and the worker node 1 fails at 3 seconds. The resource management node receives the write request and completes processing at 12.9 seconds, that is, modifies the file A, and changes a file size of the file A in a third index data table to 20. However, the distributed lock management and control node receives, at 4 seconds, a request of a worker node 2 for applying for the write lock of the file A. Because the worker node 1 fails, the distributed lock management and control node changes a trust_dn_size corresponding to the file A to false after failing to take back the write lock of the worker node 1, and sends the write lock and the trust_dn_size of the file A to the worker node 2. Because the trust_dn_size is false, the worker node 2 obtains the file size of the file A from the third index data table, and the file size is 10. Then at 5 seconds, the distributed lock management and control node takes back the write lock sent to the worker node 2, and obtains a file size 10 returned by the worker node 2. However, after the write request sent by the worker node 1 is completed at the resource management node, the file size of the file A in the third index data table is updated to 20. This causes inconsistency between the file size of the file A in the third index data table and the file size of the file A in the second index data table. The file size of the file A in the second index data table is 10, and the file size of the file A in the third index data table is 20.

The root cause of the inconsistency in the file size is that the worker node has sent the write request before the failure, so the distributed lock management and control node needs to not trust the received file size for a long enough time, to allow sufficient time for the sent write request to be completed. Therefore, when the worker node 2 sends the file size to the distributed lock management and control node, if the distributed lock management and control node finds that a time when the trust_dn_size is changed to false is less than 60 seconds, the distributed lock management and control node does not accept the file size. In addition, to avoid that the worker node 2 also fails within 60 seconds and has sent the write request before the failure, when the worker node 2 also fails, the 60-second time needs to be extended. For example, the worker node 2 fails at 40 seconds, and the distributed lock management and control node accepts the returned file size after 100 seconds, and changes the trust_dn_size to true.

According to the foregoing embodiments, it can be learned that the file size cached in the target location may be sent by the distributed management node, or may be sent by the resource management node or obtained through modification based on the modification request. Therefore, a cache structure in the first index data table may be changed, so that the cache structure in the first index data table may include a first cache unit and a second cache unit, where the first cache unit is used to cache the file size sent by the distributed management node and the file size obtained through modification based on the modification request, and the second cache unit is used to cache the file size sent by the resource management node. Therefore, after receiving the file size, differentiated storage may be performed based on a source of the file size, to improve the readability of the file size.

For example, the cache structure in the first index data table may be set to {valid_size, size_from_bs}, where the valid_size is used to cache the file size sent by the distributed management node and the file size obtained through modification based on the modification request, the size_from_bs is used to cache the file size sent by the resource management node, and initial values of the valid_size and the size_from_bs are both −1. When the worker node applies for the write lock, the distributed lock management and control node carries the node validity flag trust_dn_size while returning the write lock. If the trust_dn_size is true, the worker node sets the valid_size to the file size sent by the distributed lock management and control node; or if the trust_dn_size is false, the worker node does not set the valid_size, that is, the value of the valid_size is still −1. In addition, the read request and the inode identifier are sent to the resource management node, to obtain the file size from the resource management node, and the size_from_bs is set to the file size returned by the distributed lock management and control node.

It should be understood that because the file size does not change all the time, to reduce a communication overhead caused by the worker node frequently obtaining the file size from the resource management node in a scenario in which the trust_dn_size is false, an effective time of the file size obtained from the resource management node may be set, so that the worker node may re-obtain the file size from the resource management node after the file size obtained from the resource management node exceeds the effective time, thereby reducing a quantity of communications between the worker node and the resource management node, to reduce communication overheads. The effective time, that is, the time interval, may be set based on an actual situation, and is not limited in the embodiments of the present disclosure. For example, the time interval may be set to 10 s, 30 s, 60 s, or the like.

In other words, according to an embodiment of the present disclosure, the sending a read request to a resource management node may include:
    sending the read request to the resource management node when a time interval between a moment at which the read request is last sent to the resource management node and a current moment is greater than a preset time interval.

For example, the cache structure in the first index data table may be set to {valid_size, size_from_bs}, where the valid_size is used to cache the file size sent by the distributed management node and the file size obtained through modification based on the modification request, the size_from_bs is used to cache the file size sent by the resource management node, and initial values of the valid_size and the size_from_bs are both −1. When the worker node applies for the write lock, the distributed lock management and control node carries the node validity flag trust_dn_size while returning the write lock. If the trust_dn_size is true, the worker node sets the valid_size to the file size sent by the distributed lock management and control node; or if the trust_dn_size is false, the worker node does not set the valid_size, that is, the value of the valid_size is still −1. At this time, it is determined whether a time interval between a moment at which the read request is last sent to the resource management node and a current moment is greater than a preset time interval, for example, whether the time interval is greater than 30 s. If the time interval is less than 30 s, the file size is not obtained from the resource management node; or if the time interval is greater than 30 s, the file size is obtained from the resource management node.

It should be understood that during a write lock holding period of the worker node, there may be a case that the worker node needs to read the cached file size, or another worker node wants to read the cached file size. Because the file size cached in the worker node may be sent by the distributed management node or sent by the resource management node, when a read request for the file size is received, it may be first determined whether the file size sent by the distributed management node is valid. If the file size sent by the distributed management node is valid, the file size sent by the distributed management node is fed back to the worker node that needs to read the file size; or if the file size sent by the distributed management node is invalid, it is determined whether the file size sent by the resource management node is valid. If the file size sent by the resource management node is valid, the file size sent by the resource management node is fed back to the worker node that needs to read the file size; or if the file size sent by the resource management node is invalid, the file size is obtained from the resource management node.

In other words, according to an embodiment of the present disclosure, the method may further include:
    after receiving the first write lock, in response to a read request for a file size of the target file, determining whether the cached second file size is valid; when the second file size is valid, outputting the second file size; when the second file size is invalid, determining whether the cached third file size is valid; when the third file size is valid, outputting the third file size; or when the third file size is invalid, obtaining a file size of the target file from the resource management node.

Whether the cached file size is valid may be determined based on a specific value of the cached file size. For example, if the file size is a negative number, it may represent that the file size is invalid. If the file size is a positive number, it may represent that the file size is valid.

For example, if the file size is invalid when the file size is −1, when the worker node needs to obtain the file size, for example, when a GetAttr request is received, the valid_size is preferentially checked. If the valid_size is not −1, the valid_size is used; or if the valid_size is −1, it indicates that the cached valid_size is invalid, and then the size_from_bs is checked. If the size_from_bs is not −1 and is within an effective period, the size_from_bs is used; or if the size_from_bs is −1 or expires, it indicates that the size_from_bs is invalid. In this case, the file size needs to be obtained from the resource management node, and the file size sent by the resource management node is cached in the size_from_bs.

As described above, the size_from_bs is used to cache the file size sent by the resource management node. Therefore, after the file size cached in the valid_size or the size_from_bs is modified, the file size cached in the valid_size may be updated to the modified file size, so that the file size cached in the valid_size may be directly sent to the distributed lock management and control node when the write lock is subsequently taken back.

It should be noted that in an abnormal scenario in which the write lock is lost, only the file size cached in the size_from_bs can be updated to the modified file size, but the file size cached in the valid_size cannot be updated. This is because after the valid_size is updated by the current worker node, there is a high probability that a previous request for obtaining the file size has not reached the resource management node, so the valid_size on the worker node side is incorrect. If the distributed lock management and control node happens to take back the write lock after 60 seconds (a time during which the distributed lock management and control node cannot trust the received file size), the distributed lock management and control node accepts the incorrect valid_size, resulting in inconsistency in the file size. Therefore, in a scenario in which the write lock is lost, the worker node can only update the size_from_bs. When the write lock is taken back, because the valid_size is −1, the worker node needs to obtain the correct file size from the resource management node and send the correct file size to the distributed lock management and control node.

It should be understood that during a write lock holding period of the worker node, the updated file size is not immediately transmitted to the distributed lock management and control node, so that the corresponding file size in the second index data table cannot truly reflect the file size of the file. In this case, if another worker node wants to read the file size, the file size can be obtained after the distributed lock management and control node takes back the write lock and updates the corresponding file size in the second index data table. Because a prerequisite for taking back the write lock is that the worker node that holds the write lock does not need to use the write lock to change the file size at the current moment; otherwise, the first write lock cannot be taken back. In this way, the efficiency of reading the file size by the another worker node is affected. To overcome the above technical problem, in this embodiment, when the distributed lock management and control node sends the write lock, the file size, and the inode identifier to the worker node, target node information about receiving the write lock, the file size, and the inode identifier is recorded, so that when another worker node needs to read the file size subsequently, the target node information may be sent to the worker node that needs to read the file size, so that the worker node can obtain the file size from a target worker node corresponding to the target node information. Therefore, the file size can be obtained without waiting for the distributed lock management and control node to take back the write lock, thereby improving the efficiency of reading the file size.

Figure 4:
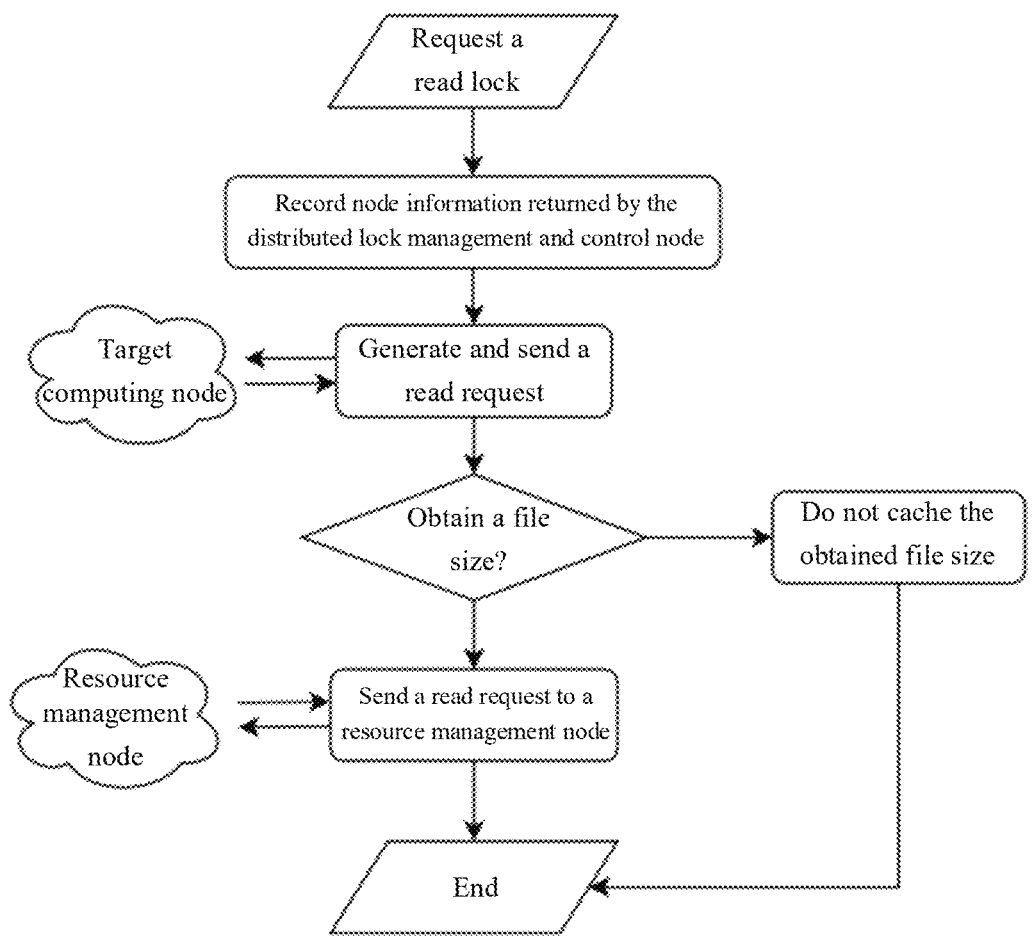
FIG. 4 is a flowchart of obtaining a file size according to an exemplary embodiment of the present disclosure.

In other words, according to an embodiment of the present disclosure, the method may further include, as shown in FIG. 4, the following steps.

In response to the read request for a file size of the target file, send a second obtaining request that is used to obtain a first read lock to the distributed lock management and control node; when there is another worker node holding the first write lock, receive target node information, which is sent by the distributed lock management and control node in response to the second obtaining request, used to represent a holding status of the first write lock; send the read request to a target worker node corresponding to the target node information; when the target worker node responds to the read request, receive a fourth file size of the target file that is sent by the target worker node, the fourth file size being cached in the target worker node; or when the target worker node does not respond to the read request, send the read request to the resource management node; receive the third file size, and cache the third file size at the target location in the first index data table based on the first inode identifier.

The target worker node does not respond to the read request. This may be that the target worker node fails, restarts, or the write lock of the target worker node is taken back at a moment when the read request is sent to the target worker node. In this case, if the node information is obtained from the distributed lock management and control node, at least two communication connections need to be established. Therefore, the file size of the target file may be directly obtained from the resource management node based on the first inode identifier, to reduce a quantity of communications and communication overheads.

The reason for not caching the file size obtained from the target worker node is that because the target worker node holds the write lock, the target worker node may change the file size at any time, resulting in the obtained file size being invalid. Therefore, after the file size is obtained from the target worker node, it is only used temporarily without being cached.

In a possible implementation, the method may further include:

obtaining a node identifier of the worker node, and when the node identifier is a first node identifier, sending a file size check request to the distributed lock management and control node, where a first worker node corresponding to the first node identifier is a worker node used to check whether a file size in the second index data table is accurate; receiving a second inode identifier, a second read lock, and a fifth file size of a file to be checked that are sent by the distributed lock management and control node in response to the file size check request, where the second inode identifier is used to identify an inode of the file to be checked, and the second read lock is used to control a read operation performed by the first worker node on the file to be checked; obtaining, from a resource management node based on the second read lock and the second inode identifier, a sixth file size of the file to be checked; determining, based on the fifth file size and the sixth file size, a check result representing whether the fifth file size is the same as the sixth file size; and sending the check result to the distributed lock management and control node, so that the distributed lock management and control node changes, based on the check result, a node validity flag of a second inode identifier in the second index data table.

The node identifier is used to identify the worker node, and may be specifically set based on an actual situation, which is not limited in the embodiments of the present disclosure. For example, a worker node 1 may be represented by a letter a, and a worker node 2 may be represented by a letter b.

The file size check request may be sent to the distributed lock management and control node automatically or manually, and may be sent periodically or aperiodically. This is not limited in the embodiments of the present disclosure.

For example, after sending the file size check request to the distributed lock management and control node, the first worker node receives the second inode identifier, the second read lock, and the fifth file size of the file to be checked that are sent by the distributed lock management and control node. Then, the first worker node first obtains, from a third index data table in the resource management node based on the second read lock and the second inode identifier, the sixth file size of the file to be checked. Then, it is compared whether the fifth file size is the same as the sixth file size, and the check result is determined based on a comparison result. Finally, the check result is sent to the distributed lock management and control node, so that the distributed lock management and control node changes, based on the check result, the node validity flag of the second inode identifier in the second index data table.

It is worth mentioning that because the inode corresponding to the second inode identifier is an inode that needs to be checked for the file size, in a single file size check process, a quantity of second inode identifiers may be determined based on an actual situation, which is not limited in the embodiments of the present disclosure. Similarly, a quantity of second read locks, a quantity of fifth file sizes, and a quantity of check results correspond to the quantity of second inode identifiers one to one. For example, if the second inode identifiers include an inode identifier 1, an inode identifier 2, and an inode identifier 3, the second read locks may include a read lock 1, a read lock 2, and a read lock 3, the fifth file sizes may include a file size 1, a file size 2, and a file size 3, the check results may include a check result 1, a check result 2, and a check result 3, and the second inode identifiers, the second read locks, the fifth file sizes, and the check results correspond to each other one to one. That is, the inode identifier 1 corresponds to the read lock 1, the file size 1, and the check result 1, the inode identifier 2 corresponds to the read lock 2, the file size 2, and the check result 2, and the inode identifier 3 corresponds to the read lock 3, the file size 3, and the check result 3.

By using the above technical solutions, the worker node may obtain, from the distributed lock management and control node, the inode identifier and the file size of the inode that needs to be checked for the file size, and then obtain, from the resource management node, the file size corresponding to the inode identifier, compare the file size with the file size sent by the distributed lock management and control node to obtain the check result, and return the check result to the distributed lock management and control node. Therefore, the distributed lock management and control node can actively sense whether there is an error in the file size in the second index data table, thereby avoiding subsequent problems caused by the error in the file size in the second index data table.

In a possible implementation, the method may further include:

obtaining a node identifier of the worker node, and when the node identifier is a second node identifier, sending a file size correction request to the distributed lock management and control node, where a second worker node is a worker node used to correct a file size in the second index data table corresponding to the second node identifier; receiving a second write lock and a third inode identifier that are sent by the distributed lock management and control node in response to the file size correction request, where the second write lock is used to control a write operation performed by the second worker node on a file to be corrected, and the third inode identifier is used to identify an inode of the file to be corrected; and in response to a take-back request sent by the distributed lock management and control node and used to take back the second write lock, obtaining, from a third index data table in a resource management node based on the third inode identifier, a seventh file size of the file to be corrected, and sending the seventh file size to the distributed lock management and control node, so that the distributed lock management and control node updates, in the second index data table, a file size of the file to be corrected to the seventh file size.

The file size correction request may be sent to the distributed lock management and control node automatically or manually, and may be sent periodically or aperiodically. This is not limited in the embodiments of the present disclosure.

For example, after sending the file size correction request to the distributed lock management and control node at moment T, a second worker node receives the second write lock and the third inode identifier that are sent by the distributed lock management and control node at moment T+1. Because the file size of the file to be corrected is incorrect, the distributed lock management and control node does not send the file size of the file to be corrected in the second index data table to the second worker node. In addition, because the second write lock is actively sent by the distributed lock management and control node, at moment T+1, the second worker node also does not need to obtain the corresponding file size from the resource management node based on the third inode identifier. When the worker node receives the take-back request for the second write lock at moment T+2, because the valid_size corresponding to the third inode identifier in the first index data table is a default value, that is, −1, the second worker node needs to obtain the corresponding file size from the third index data table based on the third inode identifier, and send the corresponding file size to the distributed lock management and control node, so that the distributed lock management and control node updates the file size of the file to be corrected in the second index data table to the seventh file size.

It should be noted that because the inode corresponding to the third inode identifier is an inode that needs to be corrected for the file size, in a single file size correction process, a quantity of third inode identifiers may be determined based on an actual situation, which is not limited in the embodiments of the present disclosure. Similarly, a quantity of second write locks corresponds to the quantity of third inode identifiers one to one. For example, if the third inode identifiers include an inode identifier 1, an inode identifier 2, and an inode identifier 3, the second write locks may include a write lock 1, a write lock 2, and a write lock 3. The third inode identifiers correspond to the second write locks one to one. That is, the inode identifier 1 corresponds to the write lock 1, the inode identifier 2 corresponds to the write lock 2, and the inode identifier 3 corresponds to the write lock 3.

Because when the write lock is lost, the worker node obtains the file size from the resource management node, which causes serious performance consumption. Therefore, in this embodiment, a file size repair mechanism is designed. That is, the worker node may obtain, from the distributed lock management and control node, the inode identifier whose trust_dn_size is false, and record the write lock of the inode identifier. When the distributed lock management and control node takes back the write lock, the worker node obtains the corresponding file size from the resource management node and sends the corresponding file size to the distributed lock management and control node, so that the distributed lock management and control node repairs the file size. Therefore, when the worker node accesses the file size corresponding to the inode identifier later, the worker node can directly obtain the file size from the distributed lock management and control node, thereby reducing the performance loss caused by the loss of the write lock.

Figure 5:
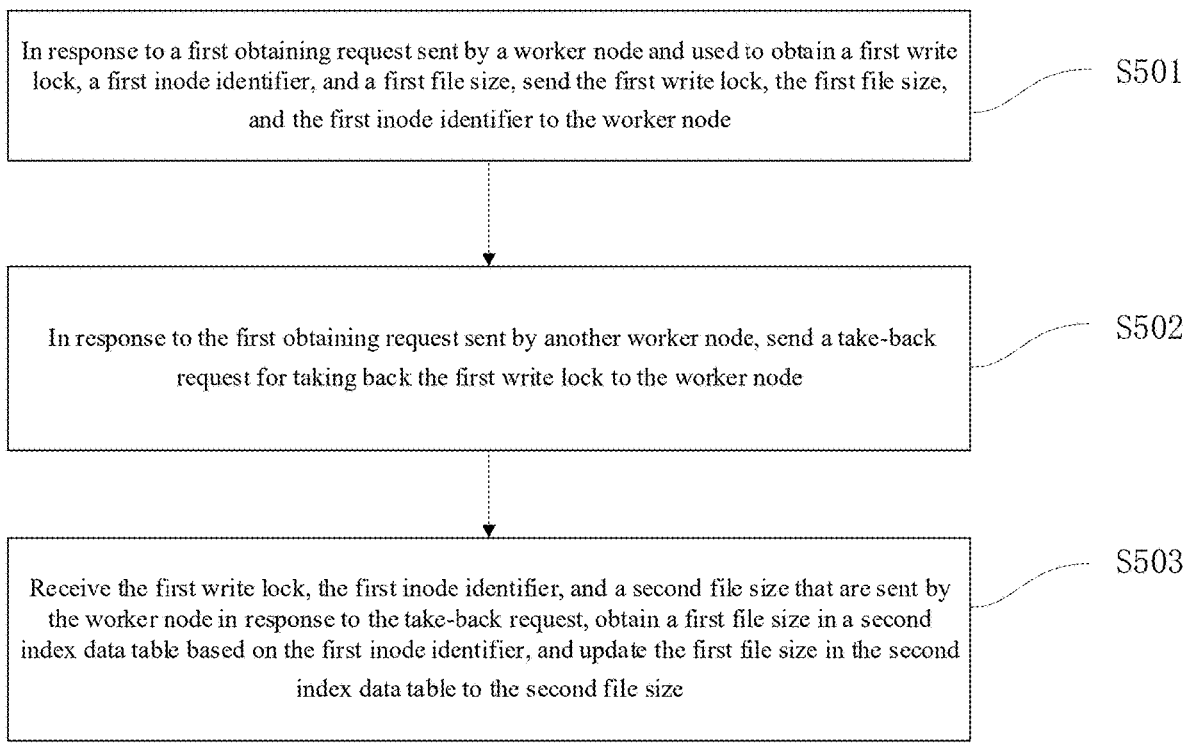
FIG. 5 is a flowchart of another distributed data storage control method according to an exemplary embodiment of the present disclosure.

Based on the same concept, an embodiment of the present disclosure further provides a distributed data storage control method. The method may include, as shown in FIG. 5:

S501: In response to a first obtaining request sent by a worker node and used to obtain a first write lock, a first inode identifier, and a first file size, send the first write lock, the first file size, and the first inode identifier to the worker node, where the first write lock is used to control a write operation performed by the worker node on a target file, the first inode identifier is used to identify an inode of the target file, and the first file size is a file size of the target file.

S502: In response to the first obtaining request sent by another worker node, send a take-back request for taking back the first write lock to the worker node.

S503: Receive the first write lock, the first inode identifier, and a second file size that are sent by the worker node in response to the take-back request, obtain a first file size in a second index data table based on the first inode identifier, and update the first file size in the second index data table to the second file size, where the second index data table is stored in a current node, the second file size is obtained by the worker node modifying, based on first modification information in a first modification request, the first file size sent by the distributed lock management and control node, and the first modification request is sent by a client.

By using the above technical solutions, when taking back the write lock, the distributed lock management and control node may receive the inode identifier and the file size sent by the corresponding worker node, and update the file size corresponding to the inode identifier in the second index data table to the file size sent by the worker node. Because the file size sent by the worker node is not sent to the distributed lock management and control node immediately after being modified, but is sent when the take-back request for the write lock is received, it can be avoided that in a scenario of highly concurrent modification of the file size, a quantity of requests for synchronizing the file size to the distributed lock management and control node is excessively large, thereby affecting the performance and the concurrency of the distributed lock management and control node.

In a possible implementation, the method may further include:

receiving the first inode identifier, the second file size, and a first write lock identifier that are periodically sent by the worker node; obtaining a second write lock identifier from the second index data table based on the first inode identifier, where the second write lock identifier is used to identify a second write lock that currently controls the write operation performed on the target file; determining whether the first write lock identifier is the same as the second write lock identifier; and when the first write lock identifier is the same as the second write lock identifier, updating the first file size in the second index data table to the second file size.

It should be understood that there is generally a one-to-one correspondence between a write lock and a write lock identifier. By determining whether the second write lock identifier is the same as the first write lock identifier when updating the file size, it can be avoided that an update error occurs.

For example, it is assumed that a second file size sent by a worker node 1 in a specific sending cycle is 10, and before the distributed lock management and control node receives the second file size sent by the worker node 1, the worker node 1 updates the second file size to 20, and the distributed lock management and control node takes back a write lock 1 of the worker node 1. Because the second file size in the worker node 1 is 20 when the write lock 1 is taken back, the distributed lock management and control node updates the first file size in the second index data table to 20. At the same time, the distributed lock management and control node further allocates a write lock 2 used to control the worker node to perform the write operation on the target file to a worker node 2. If the distributed lock management and control node receives the second file size that is sent by the worker node 1 previously at this time, and the write lock identifier is not sent, the distributed lock management and control node changes the first file size in the second index data table from 20 to 10, resulting in an update error.

To facilitate understanding of periodically updating the file size in this embodiment, the following provides a detailed description of updating the file size in one update cycle.

Figure 6:
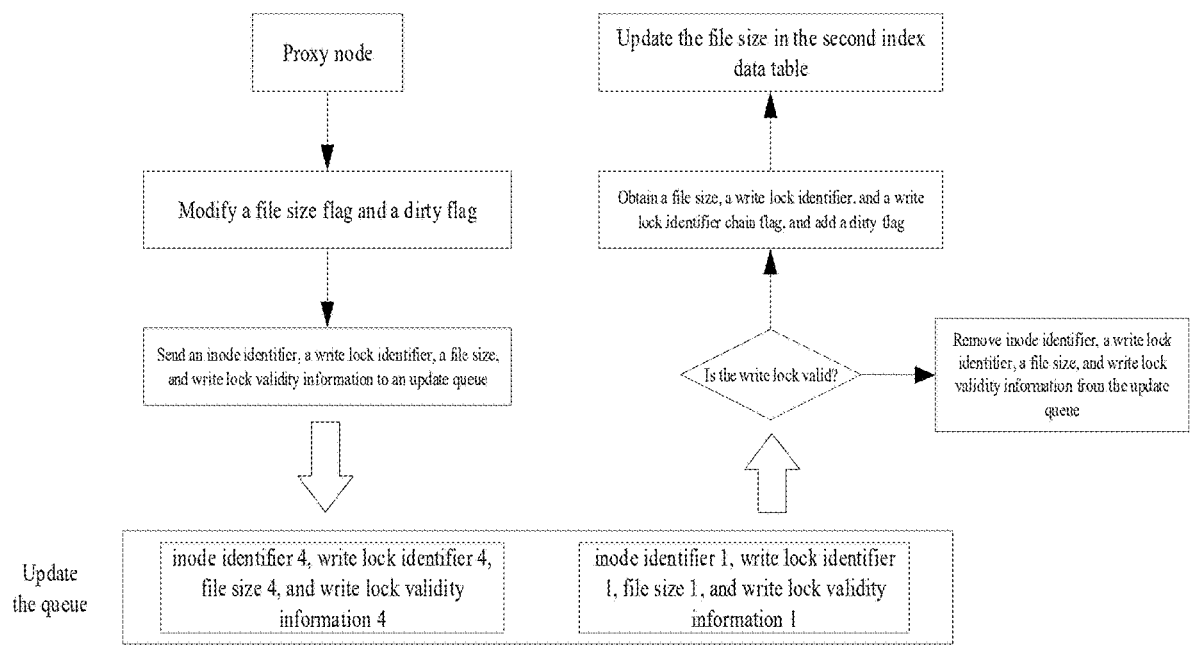
FIG. 6 is a flowchart of updating a file size in one update cycle according to an exemplary embodiment of the present disclosure.

It is assumed that a worker node receives six inode identifiers from the distributed management and control system, and before the update moment, file sizes corresponding to an inode identifier 1 and an inode identifier 4 change. Therefore, a dirty mark may be added to a file size 1 corresponding to the inode identifier 1 in the first index data table, a dirty mark may be added to a file size 4 corresponding to the inode identifier 4 in the first index data table, and the inode identifier 1, a write lock identifier 1, the file size 1, write lock validity information 1, the inode identifier 4, a write lock identifier 4, the file size 4, and write lock validity information 4 are placed in the update queue. When the update moment is reached, the worker node determines, based on an order of the inode identifiers in the update queue, for example, the inode identifier 1 is first, whether a write lock 1 is valid based on the write lock validity information 1. If the write lock 1 is valid, the inode identifier 1, the write lock identifier 1, and the file size 1 are sent to the distributed lock management and control node. After receiving the inode identifier 1, the write lock identifier 1, and the file size 1, the distributed lock management and control node first obtains a write lock identifier 3 from the second index data table based on the inode identifier 1, and determines whether the write lock identifier 3 is the same as the write lock identifier 1. When the write lock identifier 3 is the same as the write lock identifier 1, the dirty mark is cleared, and the file size corresponding to the inode identifier 1 in the second index data table is updated to the received file size 1. Then, the inode identifier 4, the write lock identifier 4, the file size 4, and the write lock validity information 4 are processed based on the same processing steps. If the write lock 1 is invalid, the inode identifier 1, the write lock identifier 1, the file size 1, and the write lock validity information 1 are removed from the update queue, and the inode identifier 4, the write lock identifier 4, the file size 4, and the write lock validity information 4 are processed based on the same processing steps. As shown in FIG. 6.

In a possible implementation, the method may further include:

obtaining, in response to a file size check request sent by a first worker node, write lock information and a node validity flag of an inode identifier, determining a second inode identifier based on the write lock information and the node validity flag, and determining a fifth file size of a file to be checked based on the second inode identifier, where the write lock information indicates whether a file corresponding to the inode identifier is allocated with a write lock, the node validity flag indicates whether a file size corresponding to the inode identifier is valid, the file size check request is sent by the first worker node, the first worker node is a worker node used to check whether a file size in the second index data table is accurate, a node identifier of the first worker node is a first node identifier, and the first worker node is a worker node used to check whether the file size in the second index data table is accurate; sending the second inode identifier, a second read lock, and the fifth file size to the first worker node, where the second read lock is used to control a read operation performed by the first worker node on the file to be checked; and receiving a check result sent by the first worker node and representing whether the fifth file size is the same as a sixth file size, and changing a node validity flag of the second inode identifier based on the check result, where the sixth file size is obtained, from a resource management node, by the first worker node based on the second read lock and the second inode identifier.

For example, at moment T, in response to the file size check request sent by the first worker node, the distributed lock management and control node first attempts to allocate a read lock to each inode in the second index data table, and skips the inode if it is found that there is a write lock conflicting with the read lock. In addition, to reduce unnecessary file size checks, the distributed lock management and control node may further determine the node validity flag of the inode to which the read lock is allocated. If the trust_dn_size is false, it indicates that the file size in the inode is invalid, and the file size check does not need to be performed on the inode. Therefore, the second inode identifiers may be obtained through screening by using the foregoing two operations. After the second inode identifiers are determined, the distributed lock management and control node sends the second inode identifiers, fifth file sizes corresponding to the second inode identifiers, and the second read locks to the first worker node at moment T+1, and receives the check results at moment T+2. If the check results represent that the fifth file sizes are the same as the sixth file sizes, no processing is performed. If the check results represent that the fifth file sizes are different from the sixth file sizes, it indicates that the fifth file sizes corresponding to the second inode identifiers in the second index data table are invalid, and the trust_dn_size corresponding to the second inode identifiers may be changed from true to false.

The first worker node does not need the second read locks after completing the check on the file size. Therefore, to reduce memory occupation of the second read locks, after receiving the check results, the distributed lock management and control node may send a take-back request for the allocated second read locks.

It is worth mentioning that because the inode corresponding to the second inode identifier is an inode that needs to be checked for the file size, in a single file size check process, a quantity of second inode identifiers may be determined based on an actual situation, which is not limited in the embodiments of the present disclosure. Similarly, a quantity of second read locks, a quantity of fifth file sizes, and a quantity of check results correspond to the quantity of second inode identifiers one to one. For example, if the second inode identifiers include an inode identifier 1, an inode identifier 2, and an inode identifier 3, the second read locks may include a read lock 1, a read lock 2, and a read lock 3, the fifth file sizes may include a file size 1, a file size 2, and a file size 3, the check results may include a check result 1, a check result 2, and a check result 3, and the second inode identifiers, the second read locks, the fifth file sizes, and the check results correspond to each other one to one. That is, the inode identifier 1 corresponds to the read lock 1, the file size 1, and the check result 1, the inode identifier 2 corresponds to the read lock 2, the file size 2, and the check result 2, and the inode identifier 3 corresponds to the read lock 3, the file size 3, and the check result 3.

By using the above technical solutions, the worker node may obtain, from the distributed lock management and control node, the inode identifier and the file size of the inode that needs to be checked for the file size, and then obtain, from the resource management node, the file size corresponding to the inode identifier, compare the file size with the file size sent by the distributed lock management and control node to obtain the check result, and return the check result to the distributed lock management and control node. Therefore, the distributed lock management and control node can actively sense whether there is an error in the file size in the second index data table, thereby avoiding subsequent problems caused by the error in the file size in the second index data table.

In a possible implementation, the obtaining write lock information and a node validity flag of an inode identifier, and determining a second inode identifier based on the write lock information and the node validity flag may include:

determining a third inode identifier based on a check progress in a first check list, where the first check list is used to store a check progress of the file size; and using the third inode identifier as a first traversal object, traversing inode identifiers in a second index data table based on a preset first traversal order, and for each traversed inode identifier, obtaining write lock information and a node validity flag, and when the write lock information indicates that an inode corresponding to the inode identifier is not allocated with a write lock, and the node validity flag represents that a file size in the inode is valid, determining the inode identifier as the second inode identifier.

A structure of the first check list may be set based on an actual situation, which is not limited in the embodiments of the present disclosure.

For example, the structure of the first check list may be: {currently checked file system identifier (fsid), inode identifier (inodeid), epoch, a total quantity of checked inodes, and check time}. The epoch represents a quantity of check rounds. The file system identifier is used to identify a file system. For example, a file system 1 may be identified by A1, and a file system 2 may be identified by A2. The inode identifier is used to identify an inode. For example, a first inode in the file system 1 may be identified by A1-1, a second inode in the file system 1 may be identified by A1-2, and a first inode in the file system 2 may be identified by A2-1.

When the third inode identifier is determined based on the foregoing first check list, if the first check list is empty, it indicates that the file size is checked for the first time. In this case, a first inode identifier in all inode identifiers in the distributed lock management and control node should be used as the third inode identifier. If the first check list is not empty, and file system identifiers do not include all file system identifiers, it indicates that checking of all the inode identifiers in the distributed lock management and control node is not completed in the current round. In this case, the third inode identifier may be determined based on the inode identifier and an arrangement order of the inode identifier that are recorded in the inode identifiers. If the first check list is not empty, and the file system identifiers include all the file system identifiers, it indicates that checking of all the inodes in the distributed lock management and control node is completed in the current round. In this case, the distributed lock management and control node records that the current epoch is completed, and enters a next epoch. That is, a first inode identifier in all the inode identifiers in the distributed lock management and control node is again used as the third inode identifier, or the file size is not checked.

For example, if there are a file system A1 and a file system A2, where the file system A1 corresponds to an inode identifier A1-1, an inode identifier A1-2, and an inode identifier A1-3, the file system A2 corresponds to an inode identifier A2-1, an inode identifier A2-2, an inode identifier A2-3, and an inode identifier A2-4, and an arrangement order of all the inode identifiers is A1-1, A1-2, A1-3, A2-1, A2-2, A2-3, and A2-4.

If the first check list is empty, the A1-1 may be used as the third inode identifier. If the first check list is represented as {A1, A1-1, A1-2, A1-3, A2-1, 0, 4, 13:20}, because the file system identifiers do not include A2, it indicates that there is an unchecked inode identifier in the file system A2. In addition, because the inode identifiers recorded in the inode identifiers are A1-1, A1-2, A1-3, and A2-1, it indicates that only the A2-1 was checked last time. Therefore, the checking may start from the A2-2 this time, that is, the A2-2 may be used as the third inode identifier. If the first check list is represented as {A1, A2, A1-1, A1-2, A1-3, A2-1, A2-2, A2-3, A2-4, 0, 7, 13:25}, because the file system identifiers include A1 and A2, it indicates that checking of all the inode identifiers in the distributed lock management and control node is completed in the current round. Therefore, the quantity of rounds may be changed from 0 to 1, and the A1-1 may be again used as the third inode identifier, or the checking is not performed.

Figure 7:
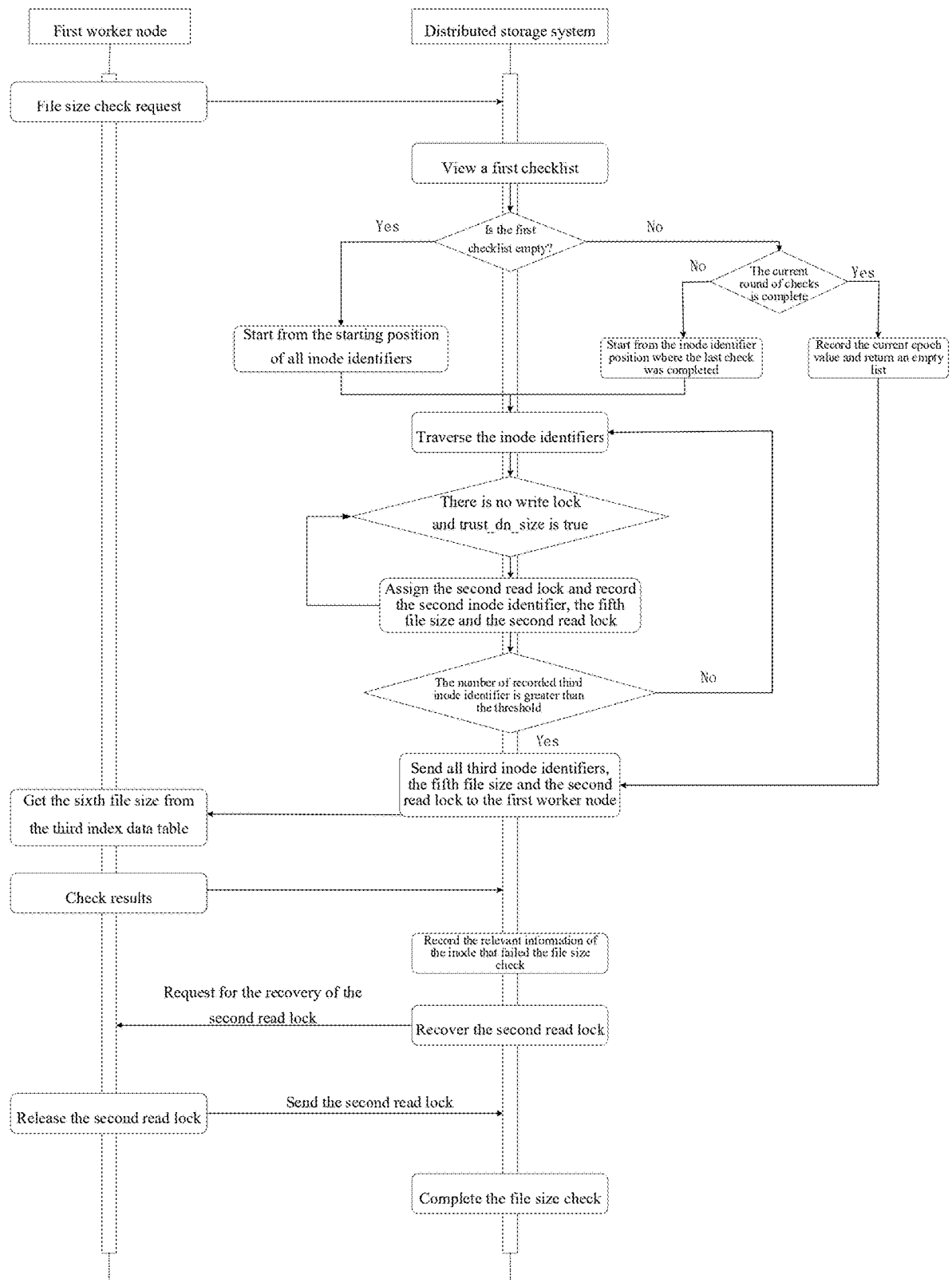
FIG. 7 is a flowchart of file size checking according to an exemplary embodiment of the present disclosure.

To facilitate understanding of the file size check in this embodiment, the following provides a detailed description of the file size check process with reference to FIG. 7.

At moment T, the first worker node sends the file size check request to the distributed lock management and control node.

At moment T+1, the distributed lock management and control node responds to the file size check request, and then checks the first check list. If the first check list is empty, traversal starts from the first inode identifier, and for each traversed inode identifier, it is determined whether an inode corresponding to the inode identifier is allocated with a write lock, or whether the trust_dn_size is false. If the inode corresponding to the inode identifier is not allocated with the write lock, and the trust_dn_size is not false, the inode identifier is determined as the second inode identifier, a second read lock is allocated to the inode corresponding to the inode identifier, and the inode identifier, a fifth file size corresponding to the inode identifier, and the second read lock are recorded. If the first check list is not empty, it is determined whether checking of all the inode identifiers in the distributed lock management and control node is completed in the current check round. If checking of all the inode identifiers in the distributed lock management and control node is completed in the current check round, no processing is performed. If checking of all the inode identifiers in the distributed lock management and control node is not completed in the current check round, traversal starts from a position where checking ended last time, and for each traversed inode identifier, it is determined whether an inode corresponding to the inode identifier is allocated with a write lock, or whether the trust_dn_size is false. If the inode corresponding to the inode identifier is not allocated with the write lock, and the trust_dn_size is not false, the inode identifier is determined as the second inode identifier, a second read lock is allocated to the inode corresponding to the inode identifier, and the inode identifier, a fifth file size corresponding to the inode identifier, and the second read lock are recorded. In addition, to avoid that another worker node modifies the file size corresponding to the second inode identifier in the second index data table during the file size check process, resulting in inaccurate check results, the file size check time should not be too long. That is, in a single file size check process, a quantity of second inode identifiers, a quantity of fifth file sizes, and a quantity of second read locks should not be excessive. Therefore, in the process of recording the second inode identifiers, the fifth file sizes, and the second read locks, it may be further detected in real time whether a quantity of recorded second inode identifiers, a quantity of recorded fifth file sizes, or a quantity of recorded second read locks is greater than a threshold.

At moment T+3, the distributed lock management and control node detects that a quantity of the second inode identifiers, a quantity of the fifth file sizes, or a quantity of the second read locks is greater than the threshold, and sends all the recorded second inode identifiers, the fifth file sizes, and the second read locks to the first worker node.

At moment T+4, the first worker node receives the second inode identifiers, the fifth file sizes, and the second read locks that are sent by the distributed lock management and control node.

At moment T+5, the first worker node obtains sixth file sizes corresponding to the second inode identifiers from the third index data table based on the second read locks and the second inode identifiers.

At moment T+6, the first worker node obtains the check results by comparing the fifth file sizes with the sixth file sizes.

At moment T+7, the first worker node sends the check results to the distributed lock management and control node.

At moment T+8, the distributed lock management and control node receives the check results. If the check results represent that the fifth file sizes are the same as the sixth file sizes, no processing is performed. If the check results represent that the fifth file sizes are different from the sixth file sizes, the trust_dn_size is changed from true to false.

In a possible implementation, to facilitate management of the inode whose trust_dn_size is false, related information of the inode whose trust_dn_size is false may be further recorded in a second check list.

In other words, according to an embodiment of the present disclosure, the method may further include:

when the check results represent that the fifth file sizes are different from the sixth file sizes, storing file information, the fifth file sizes, and the sixth file sizes corresponding to the second inode identifiers in the second check list.

The related information of the inode whose trust_dn_size is false may be determined based on an actual situation, which is not limited in the embodiments of the present disclosure. For example, the related information may include file information corresponding to the inode, a file size in the inode, the inode identifier, and the like.

A structure of the second check list may be set based on an actual situation, which is not limited in the embodiments of the present disclosure. For example, the structure of the second check list may be: {fsid, inodeid, epoch, fifth file size, sixth file size}. The fsid is a file system identifier, and is used to identify a file system. For example, a file system 1 may be identified by A1, and a file system 2 may be identified by A2. The inodeid is an inode identifier, and the epoch represents a quantity of check rounds.

In a possible implementation, the method may further include:

in response to a file size correction request sent by a second worker node, determining a third inode identifier of a file to be corrected, where the file size correction request is sent by the second worker node, the second worker node is a worker node used to correct a file size in the second index data table, a node identifier of the second worker node is a second node identifier, and the second worker node is a worker node used to correct the file size in the second index data table; sending a second write lock and the third inode identifier to the second worker node, where the second write lock is used to control a write operation performed by the worker node on the file to be corrected; in response to a modification request for a file size of the file to be corrected, sending a take-back request for taking back the second write lock to the second worker node; and receiving a seventh file size, a third inode identifier, and the second write lock, and updating a file size of the file to be corrected in the second index data table to the seventh file size, where the seventh file size is obtained, by the second worker node in response to the take-back request and based on the third inode identifier, from a third index data table in a resource management node.

For example, at moment T, in response to the file size correction request, the distributed lock management and control node determines a node identifier corresponding to each inode identifier. If the trust_dn_size is false, it indicates that a file size corresponding to the inode identifier is invalid, and the inode identifier is determined as the third inode identifier. Then, the distributed lock management and control node sends the second write lock and the third inode identifier to the second worker node. Because the file size corresponding to the third inode identifier is invalid, the distributed lock management and control node does not send the file size corresponding to the third inode identifier to the second worker node. When a modification request for the file size corresponding to the third inode identifier is received from another worker node at moment T+1, the take-back request for the second write lock is sent to the second worker node. If the seventh file size, the third inode identifier, and the second write lock that are sent by the second worker node are received at moment T+3, the file size corresponding to the third inode identifier in the second index data table is updated to the seventh file size, and then a corresponding write lock and a file size are sent to the worker node that needs to modify the file size corresponding to the third inode identifier.

It should be noted that because the file size corresponding to the third inode identifier is invalid or incorrect, in a single file size correction process, a quantity of third inode identifiers may be determined based on an actual situation, which is not limited in the embodiments of the present disclosure. Similarly, a quantity of second write locks corresponds to the quantity of third inode identifiers one to one. For example, if the third inode identifiers include an inode identifier 1, an inode identifier 2, and an inode identifier 3, the second write locks may include a write lock 1, a write lock 2, and a write lock 3. The third inode identifiers correspond to the second write locks one to one. That is, the inode identifier 1 corresponds to the write lock 1, the inode identifier 2 corresponds to the write lock 2, and the inode identifier 3 corresponds to the write lock 3.

Because when the write lock is lost, the worker node obtains the file size from the resource management node, which causes serious performance consumption. Therefore, in this embodiment, a file size repair mechanism is designed. That is, the worker node may obtain, from the distributed lock management and control node, the inode identifier whose trust_dn_size is false, and record the write lock of the inode identifier. When the distributed lock management and control node takes back the write lock, the worker node obtains the corresponding file size from the resource management node and sends the corresponding file size to the distributed lock management and control node, so that the distributed lock management and control node repairs the file size. Therefore, when the worker node accesses the file size corresponding to the inode identifier later, the worker node can directly obtain the file size from the distributed lock management and control node, thereby reducing the performance loss caused by the loss of the write lock.

In a possible implementation, the file size correction request includes target information used to determine a current correction start point, and the determining a third inode identifier of a file to be corrected in response to a file size correction request sent by a second worker node may include:

determining a fourth inode identifier based on the target information; using the fourth inode identifier as a first traversal object, traversing inode identifiers in a second index data table based on a preset second traversal order, and for each traversed inode identifier, obtaining a node validity flag of the inode identifier, where the node validity flag indicates whether a file size corresponding to the inode identifier is valid; and when the node validity flag indicates that the file size corresponding to the inode identifier is invalid, determining the inode identifier as the third inode identifier.

The target information may be an inode identifier or another element. This is not limited in the embodiments of the present disclosure. The target information may be transmitted by the distributed lock management and control node to the second worker node based on a previous correction situation. In this way, when the second worker node sends the file size correction request again, the distributed lock management and control node does not need to determine whether all the file sizes in the second index data table are valid, thereby improving the correction efficiency.

The second traversal order may be the same as or different from the first traversal order. This is not limited in the embodiments of the present disclosure.

Figure 8:
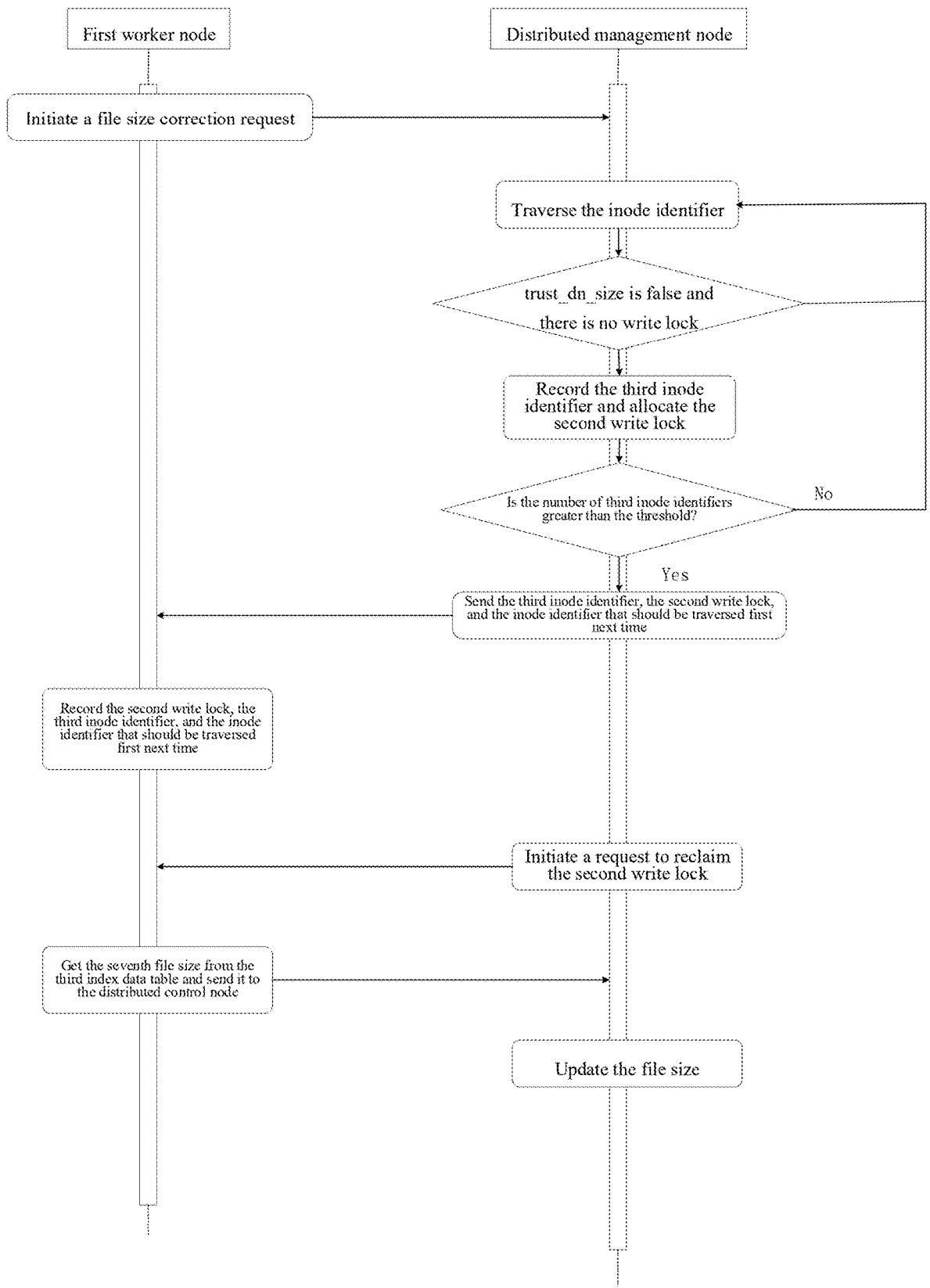
FIG. 8 is a flowchart of file size updating according to an exemplary embodiment of the present disclosure.

To facilitate understanding of the file size correction in this embodiment, the following provides a detailed description of the file size correction process with reference to FIG. 8.

At moment T, the second worker node sends the file size correction request to the distributed lock management and control node.

At moment T+1, the distributed lock management and control node responds to the file size correction request, and then determines a fourth inode identifier based on the target information. The fourth inode identifier is used as a first traversal object, and inode identifiers in the second index data table are traversed based on a preset second traversal order. For each traversed inode identifier, it is determined whether an inode corresponding to the inode identifier is allocated with a write lock, or whether the trust_dn_size is false. If the inode is not allocated with the write lock, and the trust_dn_size is false, the inode identifier is determined as the third inode identifier, a second write lock is allocated to the inode corresponding to the inode identifier, and the second write lock and the third inode identifier are recorded. In addition, to avoid that the distributed lock management and control node occupies a large quantity of communication resources when sending the second write lock and the third inode identifier, thereby affecting another communication process, a quantity of second write locks and a quantity of third inode identifiers that are sent at a time should not be excessive. Therefore, in the process of recording the second write lock, it may be further detected in real time whether a quantity of recorded second write locks or a quantity of recorded third inode identifiers is greater than a threshold.

At moment T+3, the distributed lock management and control node detects that a quantity of the second write locks or a quantity of the third inode identifiers is greater than the threshold, and sends all the recorded second write locks, the third inode identifiers, and an inode identifier that should be first traversed next time to the second worker node.

At moment T+4, the second worker node receives the second write locks, the third inode identifiers, and the inode identifier that should be first traversed next time that are sent by the distributed lock management and control node.

At moment T+5, the distributed lock management and control node responds to a modification request for the file size corresponding to the third inode identifier that is sent by another worker node, and sends a take-back request for the second write lock to the second worker node.

At moment T+6, the second worker node responds to the take-back request for the second write lock, and obtains a corresponding seventh file size from the third index data table based on the second write lock and the third inode identifier.

At moment T+7, the second worker node sends the seventh file size, the third inode identifier, and the second write lock to the distributed lock management and control node.

At moment T+8, the distributed lock management and control node receives the seventh file size, the second write lock, and the third inode identifier, updates the file size corresponding to the third inode identifier in the second index data table to the seventh file size, changes the trust_dn_size corresponding to the third inode identifier from false to true, and sends a corresponding write lock and a file size to the worker node that needs to modify the file size corresponding to the third inode identifier.

Figure 9:
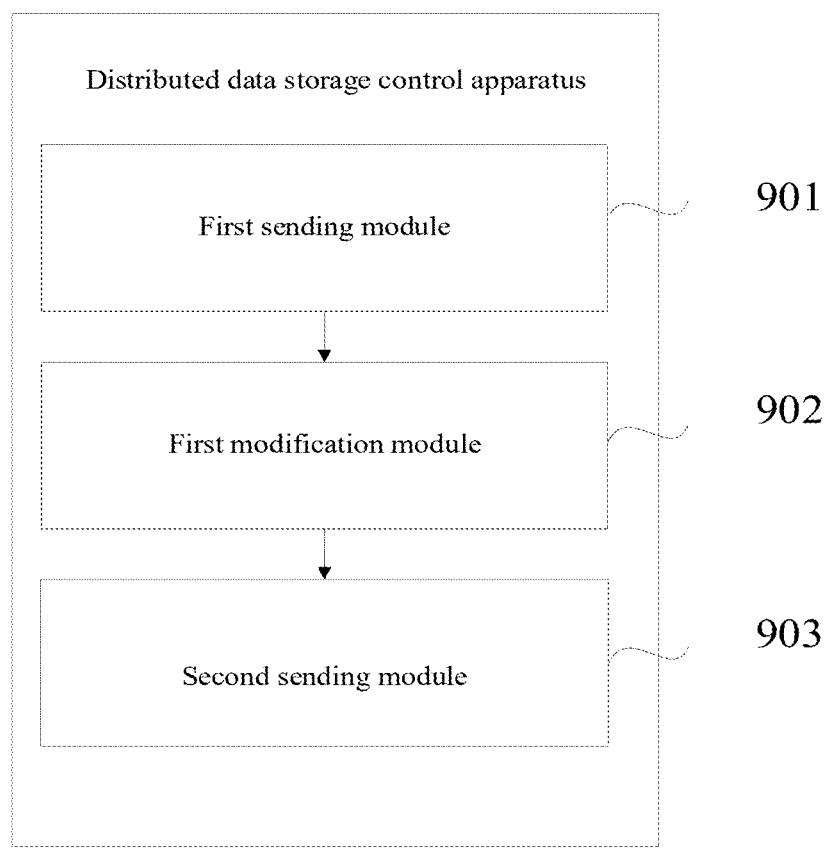
FIG. 9 is a block diagram of a structure of a distributed data storage control apparatus according to an exemplary embodiment of the present disclosure.

Based on the same concept, an embodiment of the present disclosure further provides a distributed data storage control apparatus. As shown in FIG. 9, the apparatus may include:

- a first sending module 901, configured to send, in response to a first modification request, which is sent by a client, for a target file, a first obtaining request for obtaining a first write lock, a first inode identifier, and a first file size to a distributed lock management and control node, where the first write lock is used to control a write operation performed by a worker node on the target file, the first inode identifier is used to identify an inode of the target file, and the first file size is a file size of the target file;
- a first modification module 902, configured to receive the first write lock, the first file size, and the first inode identifier that are sent by the distributed lock management and control node in response to the first obtaining request, modify the first file size based on first modification information in the first modification request to obtain a second file size, and cache the second file size in a target position in a first index data table based on the first inode identifier, where the first index data table is stored in a current worker node; and
- a second sending module 903, configured to send the first write lock, the first inode identifier, and the second file size to the distributed lock management and control node in response to a take-back request for taking back the first write lock that is sent by the distributed lock management and control node, so that the distributed lock management and control node updates the first file size corresponding to the first inode identifier in a second index data table to the second file size, where the second index data table is stored in the distributed lock management and control node.

In a possible implementation, the apparatus may further include:

- a second modification module, configured to modify the second file size based on second modification information in a second modification request for the target file that is sent by the client to obtain a modified second file size, and update the second file size in the first index data table to the modified second file size.

In a possible implementation, the apparatus may further include:

- a first obtaining module, configured to periodically obtain write lock validity information indicating whether the first write lock is valid; and
- a third sending module, configured to send the first inode identifier, the second file size, and a first write lock identifier to the distributed lock management and control node when the write lock validity information indicates that the first write lock is valid, so that the distributed lock management and control node obtains the first file size and a second write lock identifier from the second index data table based on the first inode identifier, and updates the first file size to the second file size based on the first write lock identifier and the second write lock identifier, where the first write lock identifier is used to identify the first write lock, the first write lock identifier is sent by the distributed lock management and control node when the distributed lock management and control node sends the first write lock to the worker node, and the second write lock identifier is used to identify a second write lock that currently controls a write operation performed by the worker node on the target file.

In a possible implementation, the apparatus may further include:

- a first receiving module, configured to receive a node validity flag indicating whether the first file size is valid that is sent by the distributed lock management and control node while receiving the first write lock, the first file size, and the first inode identifier;
- a first caching module, configured to cache the first file size in the target position in the first index data table based on the first inode identifier when the node validity flag indicates that the first file size is valid;
- a fourth sending module, configured to send a read request for reading a file size of the target file to a resource management node when the node validity flag indicates that the file size is invalid, so that the resource management node obtains a third file size of the target file from a third index data table based on the first inode identifier in the read request, where the third index data table is stored in the resource management node; and
- a second receiving module, configured to receive the third file size, and cache the third file size in the target position in the first index data table based on the first inode identifier.

In a possible implementation, the apparatus may further include:

- a first determining module, configured to determine, after receiving the first write lock and in response to a read request for a file size of the target file, whether a cached second file size is valid;
- a first output module, configured to output the second file size when the second file size is valid;
- a second determining module, configured to determine whether a cached third file size is valid when the second file size is invalid;

a second output module, configured to output the third file size when the third file size is valid; and a second obtaining module, configured to obtain, from the resource management node, the file size of the target file when the third file size is invalid.

In a possible implementation, the apparatus may further include:

a fifth sending module, configured to send, in response to the read request for the file size of the target file, a second obtaining request for obtaining a first read lock to the distributed lock management and control node;

a third receiving module, configured to receive target node information indicating that a first write lock is held that is sent by the distributed lock management and control node in response to the second obtaining request when there is another worker node holding the first write lock;

a sixth sending module, configured to send the read request to a target worker node corresponding to the target node information;

a fourth receiving module, configured to receive, when the target worker node responds to the read request, a fourth file size of the target file that is sent by the target worker node, where the fourth file size is cached in the target worker node;

a seventh sending module, configured to send the read request to the resource management node when the target worker node does not respond to the read request; and a second caching module, configured to receive the third file size, and cache the third file size in the target position in the first index data table based on the first inode identifier.

In a possible implementation, the seventh sending module may be configured to send the read request to the resource management node when a time interval between a moment at which the read request was last sent to the resource management node and a current moment is greater than a preset time interval.

In a possible implementation, the apparatus may further include:

an eighth sending module, configured to obtain a node identifier of the worker node, and send, when the node identifier is a first node identifier, a file size check request to the distributed lock management and control node, where a first worker node corresponding to the first node identifier is a worker node used to check whether a file size in the second index data table is accurate;

a fifth receiving module, configured to receive a second inode identifier, a second read lock, and a fifth file size of a file to be checked that are sent by the distributed lock management and control node in response to the file size check request, where the second inode identifier is used to identify an inode of the file to be checked, and the second read lock is used to control a read operation performed by the first worker node on the file to be checked;

a third obtaining module, configured to obtain a sixth file size of the file to be checked from a resource management node based on the second read lock and the second inode identifier;

a third determining module, configured to determine, based on the fifth file size and the sixth file size, a check result representing whether the fifth file size is the same as the sixth file size; and a ninth sending module, configured to send the check result to the distributed lock management and control node, so that the distributed lock management and control node changes a node validity flag of the second inode identifier in the second index data table based on the check result.

In a possible implementation, the apparatus may further include:

a tenth sending module, configured to obtain a node identifier of the worker node, and send, when the node identifier is a second node identifier, a file size correction request to the distributed lock management and control node, where a second worker node corresponding to the second node identifier is a worker node used to correct a file size in the second index data table;

a sixth receiving module, configured to receive a second write lock and a third inode identifier that are sent by the distributed lock management and control node in response to the file size correction request, where the second write lock is used to control a write operation performed by the second worker node on a file to be corrected, and the third inode identifier is used to identify an inode of the file to be corrected; and an eleventh sending module, configured to obtain, in response to a take-back request for taking back the second write lock that is sent by the distributed lock management and control node, a seventh file size of the file to be corrected from a third index data table in a resource management node based on the third inode identifier, and send the seventh file size, the third inode identifier, and the second write lock to the distributed lock management and control node, so that the distributed lock management and control node updates a file size corresponding to the third inode identifier in the second index data table to the seventh file size.

Figure 10:
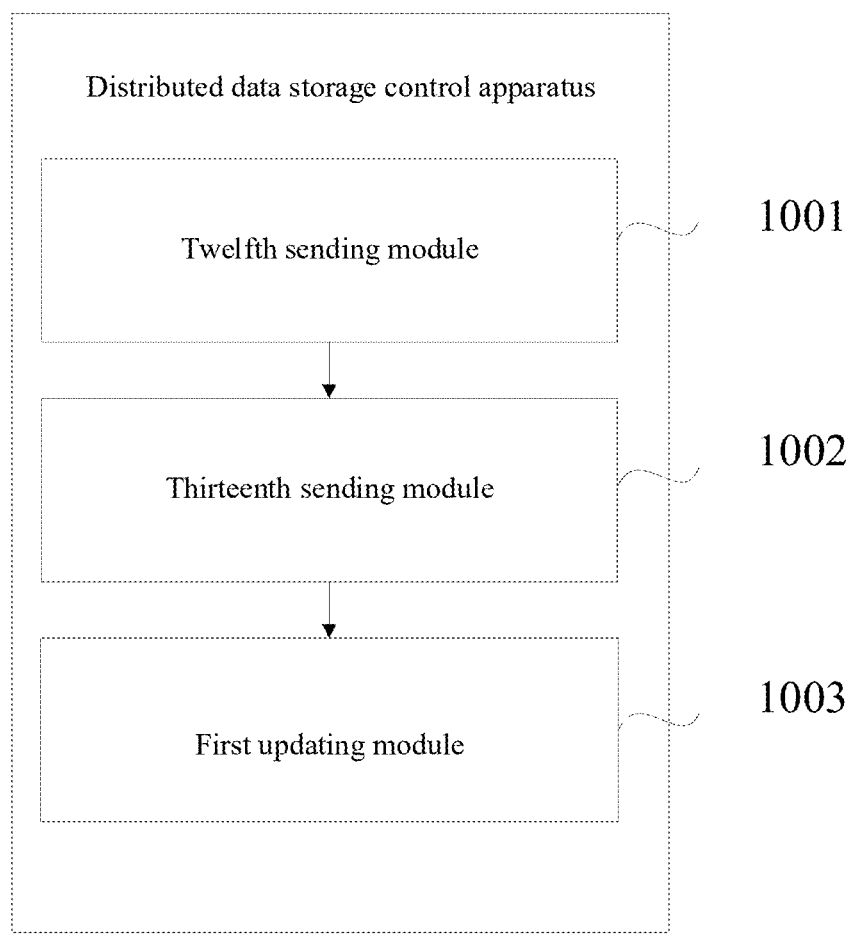
FIG. 10 is a block diagram of a structure of another distributed data storage control apparatus according to an exemplary embodiment of the present disclosure.

Based on the same concept, an embodiment of the present disclosure further provides a distributed data storage control apparatus. The apparatus may be shown in FIG. 10, and include:

a twelfth sending module 1001, configured to send a first write lock, a first file size, and a first inode identifier to a worker node in response to a first obtaining request for obtaining the first write lock, the first inode identifier, and the first file size that is sent by the worker node, where the first write lock is used to control a write operation performed by the worker node on a target file, the first inode identifier is used to identify an inode of the target file, and the first file size is a file size of the target file;

a thirteenth sending module 1002, configured to send a take-back request for taking back the first write lock to the worker node in response to the first obtaining request that is sent by another worker node; and a first updating module 1003, configured to receive the first write lock, the first inode identifier, and a second file size that are sent by the worker node in response to the take-back request, obtain a first file size in a second index data table based on the first inode identifier, and update the first file size in the second index data table to the second file size, where the second index data table is stored in a current node, the second file size is obtained by the worker node by modifying, based on first modification information in a first modification request, the first file size that is sent by a distributed lock management and control node, and the first modification request is sent by a client.

In a possible implementation, the apparatus may further include:
- a seventh receiving module, configured to receive the first inode identifier, the second file size, and a first write lock identifier that are periodically sent by the worker node;
- a fourth obtaining module, configured to obtain a second write lock identifier from the second index data table based on the first inode identifier, where the second write lock identifier is used to identify a second write lock that currently controls a write operation performed by the worker node on the target file;
- a fourth determining module, configured to determine whether the first write lock identifier is the same as the second write lock identifier; and
- a second updating module, configured to update the first file size in the second index data table to the second file size when the first write lock identifier is the same as the second write lock identifier.

In a possible implementation, the apparatus may further include:
- a fifth determining module, configured to obtain write lock information and a node validity flag of an inode identifier in response to a file size check request sent by a first worker node, determine a second inode identifier based on the write lock information and the node validity flag, and determine a fifth file size of a file to be checked based on the second inode identifier, where the write lock information indicates whether a file corresponding to the inode identifier is allocated with a write lock, the node validity flag indicates whether a file size corresponding to the inode identifier is valid, the file size check request is sent by the first worker node, the first worker node is a worker node used to check whether a file size in the second index data table is accurate, a node identifier of the first worker node is a first node identifier, and the first worker node is a worker node used to check whether the file size in the second index data table is accurate;
- a fourteenth sending module, configured to send the second inode identifier, a second read lock, and the fifth file size to the first worker node, where the second read lock is used to control a read operation performed by the first worker node on the file to be checked; and
- a changing module, configured to receive a check result representing whether a fifth file size is the same as a sixth file size that is sent by the first worker node, and change a node validity flag of the second inode identifier based on the check result, where the sixth file size is obtained by the first worker node based on the second read lock and the second inode identifier from a resource management node.

In a possible implementation, the fifth determining module may include:
- a first determining unit, configured to determine a third inode identifier based on a check progress in a first check list, where the first check list is used to store the check progress of the file size; and
- a second determining unit, configured to use the third inode identifier as a first traversal object, traverse inode identifiers in a second index data table based on a preset first traversal order, and for each traversed inode identifier, obtain write lock information and a node validity flag, and when the write lock information indicates that an inode corresponding to the inode identifier is not allocated with a write lock, and the node validity flag represents that a file size in the inode is valid, determine the inode identifier as the second inode identifier.

In a possible implementation, the apparatus may further include:
- a sixth determining module, configured to determine a third inode identifier of a file to be corrected in response to a file size correction request sent by a second worker node, where the file size correction request is sent by the second worker node, the second worker node is a worker node used to correct a file size in the second index data table, a node identifier of the second worker node is a second node identifier, and the second worker node is a worker node used to correct the file size in the second index data table;
- a fifteenth sending module, configured to send a second write lock and the third inode identifier to the second worker node, where the second write lock is used to control a write operation performed by the worker node on the file to be corrected;
- a sixteenth sending module, configured to send a take-back request for taking back the second write lock to the second worker node in response to a modification request for a file size of the file to be corrected; and
- a third updating module, configured to receive a seventh file size, a third inode identifier, and the second write lock, and update a file size corresponding to the third inode identifier in the second index data table to the seventh file size, where the seventh file size is obtained, by the second worker node in response to the take-back request and based on the third inode identifier, from a third index data table in a resource management node.

In a possible implementation, the file size correction request includes target information used to determine a current correction start point. Correspondingly, the sixth determining module may include:
- a third determining unit, configured to determine a fourth inode identifier based on the target information;
- an obtaining unit, configured to use the fourth inode identifier as a first traversal object, traverse inode identifiers in a second index data table based on a preset second traversal order, and for each traversed inode identifier, obtain a node validity flag of the inode identifier, where the node validity flag indicates whether a file size corresponding to the inode identifier is valid; and
- a fourth determining unit, configured to determine the inode identifier as the third inode identifier when the node validity flag indicates that the file size corresponding to the inode identifier is invalid.

Based on the same concept, an embodiment of the present disclosure further provides a computer-readable medium having a computer program stored thereon, where when the program is executed by a processing apparatus, steps of the method according to any one of the first aspect or the second aspect are implemented.

Based on the same concept, an embodiment of the present disclosure further provides an electronic device. The electronic device may include:
- a storage apparatus having a computer program stored thereon; and
- a processing apparatus configured to execute the computer program in the storage apparatus to implement steps of the method according to any one of the first aspect or the second aspect.

Figure 11:
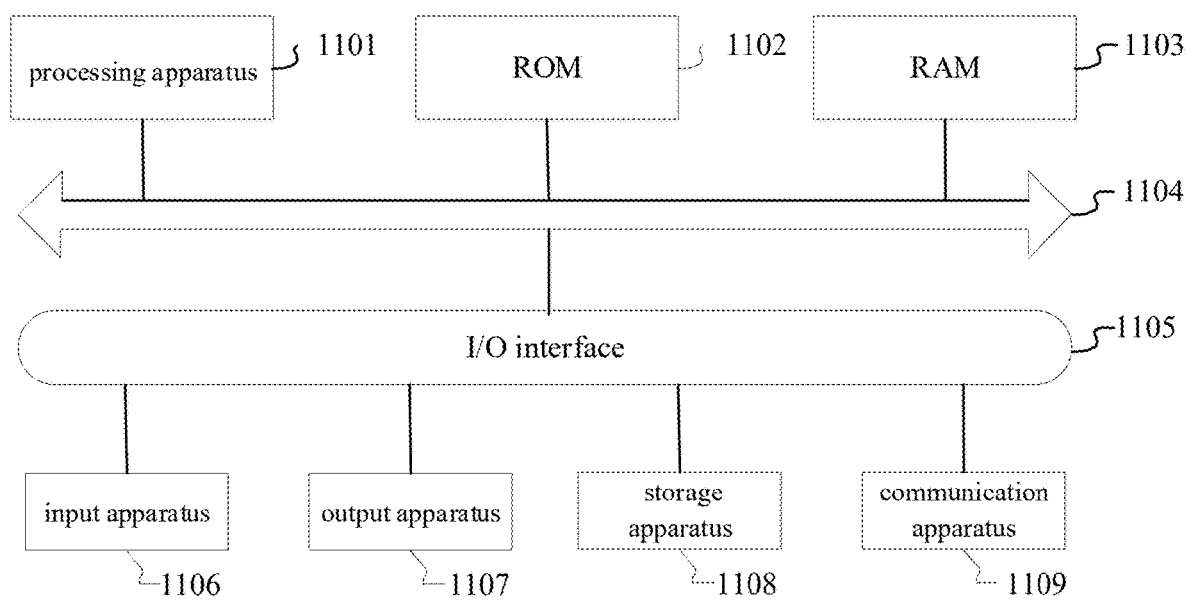
FIG. 11 is a schematic diagram of a structure of an electronic device according to an exemplary embodiment of the present disclosure.

Reference is made to FIG. 11 below, which is a schematic diagram of a structure of an electronic device 1100 suitable for implementing an embodiment of the present disclosure.

A terminal device in the embodiments of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 11 is merely an example, and shall not impose any limitation on the function and scope of use of the embodiments of the present disclosure.

As shown in FIG. 11, the electronic device 1100 may include a processing apparatus (for example, a central processing unit, a graphics processing unit, etc.) 1101 that may perform various appropriate actions and processing in accordance with a program stored in a read-only memory (ROM) 1102 or a program loaded from a storage apparatus 1108 into a random access memory (RAM) 1103. The RAM 1103 further stores various programs and data required for the operation of the electronic device 1100. The processing apparatus 1101, the ROM 1102, and the RAM 1103 are connected to each other through a bus 1104. An input/output (I/O) interface 1105 is also connected to the bus 1104.

Generally, the following apparatuses may be connected to the I/O interface 1105: an input apparatus 1106 including, for example, a touch screen, a touchpad, a keyboard, a mouse, a camera, a microphone, an accelerometer, and a gyroscope; an output apparatus 1107 including, for example, a liquid crystal display (LCD), a speaker, and a vibrator; a storage apparatus 1108 including, for example, a tape and a hard disk; and a communication apparatus 1109. The communication apparatus 1109 may allow the electronic device 1100 to perform wireless or wired communication with other devices to exchange data. Although FIG. 11 shows the electronic device 1100 having various apparatuses, it should be understood that it is not required to implement or have all the shown apparatuses. It may be an alternative to implement or have more or fewer apparatuses.

In particular, according to an embodiment of the present disclosure, the process described above with reference to the flowcharts may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded from a network through the communication apparatus 1109 and installed, installed from the storage apparatus 1108, or installed from the ROM 1102. When the computer program is executed by the processing apparatus 1101, the above-mentioned functions defined in the method of the embodiment of the present disclosure are performed.

It should be noted that the computer-readable medium described above in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, communication may be performed using any currently known or future-developed network protocol such as HyperText Transfer Protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs, and when the one or more programs are executed by the electronic device, the electronic device can perform the steps of the method according to any one of the first aspect or the second aspect.

Alternatively, the above computer-readable medium carries one or more programs, and when the one or more programs are executed by the electronic device, the electronic device can perform the steps of the method according to any one of the first aspect or the second aspect.

The computer program code for performing the operations in the present disclosure may be written in one or more programming languages or a combination thereof, where the programming languages include but are not limited to object-oriented programming languages, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving the remote computer, the remote computer may be connected to the computer of the user over any type of network, including a local area network (LAN) or a wide area network (WAN), or may be connected to an external computer (for example, connected over the Internet using an Internet service provider).

The flowcharts and block diagrams in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that in some alternative implementations, the functions marked in the blocks may also occur in an order different from that marked in the accompanying drawings. For example, two blocks shown in succession may actually be performed substantially in parallel, or they may sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The modules involved in the embodiments described in the present disclosure may be implemented by means of software, or may be implemented by means of hardware. The name of a module does not constitute a limitation on the module in some cases.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system on a chip (SOC), a complex programmable logic device (CPLD), and the like.

In the context of the present disclosure, a machine-readable medium may be a tangible medium that may contain or store a program that is used by or in combination with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. A more specific example of the machine-readable storage medium may include an electrical connection based on one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

The foregoing descriptions are merely preferred embodiments of the present disclosure and explanations of the applied technical principles. A person skilled in the art should understand that the scope of disclosure involved in the present disclosure is not limited to the technical solution formed by a specific combination of the foregoing technical features, and shall also cover other technical solutions formed by any combination of the foregoing technical features or equivalent features thereof without departing from the foregoing concept of disclosure. For example, the foregoing features are replaced with technical features with similar functions disclosed in the present disclosure to form a technical solution.

In addition, although the various operations are depicted in a specific order, it should be understood as requiring these operations to be performed in the specific order shown or in a sequential order. Under specific circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. On the contrary, various features described in the context of a single embodiment can also be implemented in a plurality of embodiments individually or in any suitable subcombination.

Although the subject matter has been described in a language specific to structural features and/or logical actions of the method, it should be understood that the subject matter defined in the appended claims is not necessarily limited to the specific features or actions described above. On the contrary, the specific features and actions described above are merely exemplary forms for implementing the claims. With respect to the apparatus in the foregoing embodiments, the specific manners in which the respective modules perform the operations have been described in detail in the embodiments related to the method, and will not be described in detail herein.

The invention claimed is:

1. A distributed data storage control method, comprising:
sending, in response to a first modification request, which is sent by a client, for a target file, a first obtaining request to a distributed lock management and control node, wherein the first obtaining request is used to obtain a first write lock, a first inode identifier, and a first file size, the first write lock is used to control a write operation performed by a worker node on the target file, the first inode identifier is used to identify an inode of the target file, and the first file size is a file size of the target file;
receiving the first write lock, the first file size, and the first inode identifier that are returned by the distributed lock management and control node, modifying the first file size based on first modification information in the first modification request to obtain a second file size, and caching, based on the first inode identifier, the second file size at a target location in a first index data table, wherein the first index data table is stored in a current worker node; and
sending, in response to a take-back request sent by the distributed lock management and control node and used to take back the first write lock, the first write lock, the first inode identifier, and the second file size to the distributed lock management and control node, so that the distributed lock management and control node updates the first file size, corresponding to the first inode identifier, in a second index data table to the second file size, wherein the second index data table is stored in the distributed lock management and control node.

2. The method according to claim 1, further comprising:
periodically obtaining write lock validity information representing whether the first write lock is valid; and
when the write lock validity information represents that the first write lock is valid, sending the first inode identifier, the second file size, and a first write lock identifier to the distributed lock management and control node, so that the distributed lock management and control node updates the first file size to the second file size.

3. The method according to claim 1, further comprising:
receiving a node validity flag sent by the distributed lock management and control node and representing whether the first file size is valid;
when the node validity flag represents that the first file size is valid, caching the first file size at the target location in the first index data table based on the first inode identifier;
when the node validity flag represents that the file size is invalid, sending a read request for reading the file size of the target file to a resource management node; and
receiving a third file size of the target file in a third index data table that is returned by the resource management node, and caching the third file size at the target location in the first index data table based on the inode identifier.

4. The method according to claim 3, further comprising:
after the first write lock is received, determining, in response to the read request for the file size of the target file, whether the cached second file size is valid;
when the second file size is valid, outputting the second file size;
when the second file size is invalid, determining whether the cached third file size is valid;
when the third file size is valid, outputting the third file size; and
when the third file size is invalid, obtaining the file size of the target file from the resource management node.

5. The method according to claim 3, further comprising:
sending, in response to the read request for the file size of the target file, a second obtaining request that is used to obtain a first read lock to the distributed lock management and control node;
when there is another worker node holding the first write lock, receiving target node information returned by the distributed lock management and control node and used to represent holding the first write lock;
sending the read request to a target worker node corresponding to the target node information;
when the target worker node responds to the read request, receiving a fourth file size of the target file that is sent by the target worker node, wherein the fourth file size is cached in the target worker node;
when the target worker node does not respond to the read request, sending the read request to the resource management node; and
receiving the third file size, and caching the third file size at the target location in the first index data table based on the inode identifier.

6. The method according to claim 5, wherein the sending a read request for reading the file size of the target file to a resource management node comprises:
sending the read request to the resource management node when a time interval between a moment at which a read request is sent to the resource management node last time and a current moment is greater than a preset time interval.

7. The method according to claim 1, further comprising:
when a node identifier of the worker node represents that the worker node is a first worker node used to check whether a file size in the second index data table is accurate, sending a file size check request to the distributed lock management and control node;

receiving a second inode identifier, a second read lock, and a fifth file size of a file to be checked that are returned by the distributed lock management and control node, the second inode identifier being used to identify an inode of the file to be checked, and the second read lock being used to control a read operation performed by the first worker node on the file to be checked;
obtaining, based on the second read lock and the second inode identifier, a sixth file size of the file to be checked from a resource management node;
determining, based on the fifth file size and the sixth file size, a check result representing whether the fifth file size is the same as the sixth file size; and
sending the check result to the distributed lock management and control node, so that the distributed lock management and control node changes a node validity flag corresponding to the second inode identifier in the second index data table based on the check result.

8. The method according to claim 1, further comprising:
when a node identifier of the worker node represents that the worker node is a second worker node used to correct a file size in the second index data table, sending a file size correction request to the distributed lock management and control node;
receiving a second write lock and a third inode identifier that are returned by the distributed lock management and control node, wherein the second write lock is used to control a write operation performed by the second worker node on a file to be corrected, and the third inode identifier is used to identify an inode of the file to be corrected; and
obtaining, in response to a take-back request sent by the distributed lock management and control node and used to take back the second write lock, a seventh file size of the file to be corrected based on the third inode identifier from a third index data table in a resource management node, and sending the seventh file size, the third inode identifier, and the second write lock to the distributed lock management and control node, so that the distributed lock management and control node updates a file size corresponding to the third inode identifier in the second index data table to the seventh file size.

9. A non-transitory computer-readable medium, having a computer program stored thereon, wherein when the computer program is executed by a processing apparatus, the steps of the distributed data storage control method according to claim 1 are implemented.

10. A distributed data storage control method, comprising:
sending, in response to a first obtaining request, which is sent by a worker node, for obtaining a first write lock, a first inode identifier, and a first file size, the first write lock, the first file size, and the first inode identifier to the worker node, wherein the first write lock is used to control a write operation performed by the worker node on a target file, the first inode identifier is used to identify an inode of the target file, and the first file size is a file size of the target file;
sending, in response to the first obtaining request sent by another worker node, a take-back request used to take back the first write lock to the worker node; and
receiving the first write lock, the first inode identifier, and a second file size that are returned by the worker node, obtaining the first file size in a second index data table based on the first inode identifier, and updating the first file size in the second index data table to the second file size, wherein the second index data table is stored in a current node, the second file size is obtained by the worker node by modifying the first file size that is sent by the distributed lock management and control node based on first modification information in a first modification request, and the first modification request is sent by a client.

11. The method according to claim 10, further comprising:
receiving the first inode identifier, the second file size, and a first write lock identifier that are periodically sent by the worker node;
obtaining a second write lock identifier from the second index data table based on the first inode identifier, wherein the second write lock identifier is used to identify a second write lock currently controlling the write operation performed on the target file;
determining whether the first write lock identifier is the same as the second write lock identifier; and
when the first write lock identifier is the same as the second write lock identifier, updating the first file size in the second index data table to the second file size.

12. The method according to claim 10, further comprising:
in response to a file size check request sent by a first worker node, obtaining write lock information and a node validity flag of an inode identifier, determining a second inode identifier based on the write lock information and the node validity flag, and determining a fifth file size of a file to be checked based on the second inode identifier, wherein the write lock information is used to indicate whether a write lock is allocated to a file corresponding to the inode identifier, the node validity flag is used to indicate whether a file size corresponding to the inode identifier is valid, the file size check request is sent by the first worker node, and the first worker node is a worker node used to check whether a file size in the second index data table is accurate;
sending the second inode identifier, a second read lock, and the fifth file size to the first worker node, wherein the second read lock is used to control a read operation performed by the first worker node on the file to be checked; and
receiving a check result representing whether a fifth file size is the same as a sixth file size and sent by the first worker node, and changing a node validity flag corresponding to the second inode identifier based on the check result, wherein the sixth file size is obtained by the first worker node from a resource management node based on the second read lock and the second inode identifier.

13. The method according to claim 12, wherein the obtaining write lock information and a node validity flag of an inode identifier, and determining a second inode identifier based on the write lock information and the node validity flag comprises:
determining a third inode identifier based on a check progress in a first check table, wherein the first check table is used to store a check progress of the file size; and
using the third inode identifier as a first traversal object, traversing, based on a preset first traversal order, inode identifiers in the second index data table, and for each traversed inode identifier, obtaining write lock information and a node validity flag, and when the write lock information indicates that a write lock is not allocated to an inode corresponding to the inode identifier and the node validity flag represents that the file size in the inode is valid, determining the inode identifier as the second inode identifier.

14. The method according to claim 10, further comprising:
determining, in response to a file size correction request sent by a second worker node, a third inode identifier of a file to be corrected, wherein the file size correction request is sent by the second worker node, and the second worker node is a worker node used to correct a file size in the second index data table;
sending a second write lock and the third inode identifier to the second worker node, wherein the second write lock is used to control a write operation performed by the worker node on the file to be corrected;
sending, in response to a modification request for the file size of the file to be corrected, a take-back request used to take back the second write lock to the second worker node; and
receiving a seventh file size, the third inode identifier, and the second write lock, and updating a file size corresponding to the third inode identifier in the second index data table to the seventh file size, wherein the seventh file size is a seventh file size of the to-be-corrected file obtained by the second worker node, in response to the take-back request, from a third index data table in a resource management node according to the third inode identifier.

15. The method according to claim 14, wherein the file size correction request comprises target information used to determine a correction start point for this time, and the determining, in response to a file size correction request sent by a second worker node, a third inode identifier of a file to be corrected comprises:
determining a fourth inode identifier based on the target information;
using the fourth inode identifier as a first traversal object, traversing, based on a preset second traversal order, inode identifiers in the second index data table, and for each traversed inode identifier, obtaining a node validity flag of the inode identifier, wherein the node validity flag is used to represent whether a file size corresponding to the inode identifier is valid; and
when the node validity flag represents that the file size corresponding to the inode identifier is invalid, determining the inode identifier as the third inode identifier.

16. A non-transitory computer-readable medium, having a computer program stored thereon, wherein when the computer program is executed by a processing apparatus, the steps of the distributed data storage control method according to claim 10 are implemented.

17. An electronic device, wherein the electronic device comprises:
a storage apparatus, having a computer program stored thereon; and
a processing apparatus, configured to execute the computer program in the storage apparatus, to implement the steps of the distributed data storage control method according to claim 10.

18. An electronic device, wherein the electronic device comprises:
a storage apparatus, having a computer program stored thereon; and
a processing apparatus, configured to execute the computer program in the storage apparatus, to implement the steps of a distributed data storage control method, and the distributed data storage control method comprises:

sending, in response to a first modification request, which is sent by a client, for a target file, a first obtaining request to a distributed lock management and control node, wherein the first obtaining request is used to obtain a first write lock, a first inode identifier, and a first file size, the first write lock is used to control a write operation performed by a worker node on the target file, the first inode identifier is used to identify an inode of the target file, and the first file size is a file size of the target file;

receiving the first write lock, the first file size, and the first inode identifier that are returned by the distributed lock management and control node, modifying the first file size based on first modification information in the first modification request to obtain a second file size, and caching, based on the first inode identifier, the second file size at a target location in a first index data table, wherein the first index data table is stored in a current worker node; and sending, in response to a take-back request sent by the distributed lock management and control node and used to take back the first write lock, the first write lock, the first inode identifier, and the second file size to the distributed lock management and control node, so that the distributed lock management and control node updates the first file size, corresponding to the first inode identifier, in a second index data table to the second file size, wherein the second index data table is stored in the distributed lock management and control node.

* * * * *